US011450075B2

(12) United States Patent
Vats

(10) Patent No.: US 11,450,075 B2
(45) Date of Patent: Sep. 20, 2022

(54) VIRTUALLY TRYING CLOTHS ON REALISTIC BODY MODEL OF USER

(71) Applicant: Nitin Vats, Bengaluru (IN)

(72) Inventor: Nitin Vats, Bengaluru (IN)

( * ) Notice: Subject to any disclaimer, the term of this patent is extended or adjusted under 35 U.S.C. 154(b) by 0 days.

(21) Appl. No.: 16/072,896

(22) PCT Filed: Jan. 27, 2017

(86) PCT No.: PCT/IB2017/050454
§ 371 (c)(1),
(2) Date: Jul. 26, 2018

(87) PCT Pub. No.: WO2017/130158
PCT Pub. Date: Aug. 3, 2017

(65) Prior Publication Data
US 2019/0026954 A1    Jan. 24, 2019

(30) Foreign Application Priority Data
Jan. 27, 2016 (IN) .......................... 3580/DEL/2015

(51) Int. Cl.
*G06T 19/20* (2011.01)
*G06T 13/40* (2011.01)
(Continued)

(52) U.S. Cl.
CPC ......... *G06T 19/20* (2013.01); *G06Q 30/0643* (2013.01); *G06T 11/001* (2013.01);
(Continued)

(58) Field of Classification Search
CPC ....... G06T 19/20; G06T 11/001; G06T 13/40; G06T 17/20; G06T 2210/16; G06K 9/00281; G06K 9/00369
See application file for complete search history.

(56) References Cited

U.S. PATENT DOCUMENTS 8,818,883 B2 * 8/2014 Lawrence ............... G06F 3/011
705/26.1

OTHER PUBLICATIONS

Chen et al., "PoseShop: Human Image Database Construction and Personalized Content Synthesis", 2013, IEEE Transactions on Visualization and Computer Graphics, vol. 19, No. 5, pp. 824-837. (Year: 2013).*

* cited by examiner

*Primary Examiner* — Chong Wu
(74) *Attorney, Agent, or Firm* — Crose Law LLC; Bradley D. Crose

(57) ABSTRACT

A method for generating a body model of a person wearing a cloth includes receiving an user input related to a person, wherein the user input comprises at least one image or photograph of the person, wherein at least one image of the person has face of the person, using a human body information to identify requirement of the other body part/s, receiving at least one image or photograph of other human body part/s based on identified requirement, processing the image/s of the person with the image/s or photograph/s of other human body part/s using the human body information to generate a body model of the person, wherein the body model represent the person whose image/photograph is received as user input, and the body model comprises face of the person, receiving an image of a cloth according to shape and size of the body model of the person, and combining the body model of the person and the image of the cloth to show the body model of the human wearing the cloth. The human body information comprises at least one of orientation of face of the person in the image of the person, orientation of body of the person in the image of the person, skin tone of the person, type of body part/s shown in the image of person, location and geometry of one or more body parts in image of the person, body/body parts shape, size of (Continued)

the person, weight of the person, height of the person, facial feature information, or nearby portion of facial features, or combination thereof. The facial feature information comprises at least one of shape or location of at least face, eyes, chin, neck, lips, nose, or ear, or combination thereof.

15 Claims, 19 Drawing Sheets

(51) Int. Cl.
*G06Q 30/06* (2012.01)
*G06T 19/00* (2011.01)
*G06V 40/10* (2022.01)
*G06V 40/16* (2022.01)
*G06T 11/00* (2006.01)
*G06T 17/20* (2006.01)

(52) U.S. Cl.
CPC .............. *G06T 13/40* (2013.01); *G06T 17/20* (2013.01); *G06T 19/00* (2013.01); *G06V 40/103* (2022.01); *G06V 40/171* (2022.01); *G06T 2210/16* (2013.01)

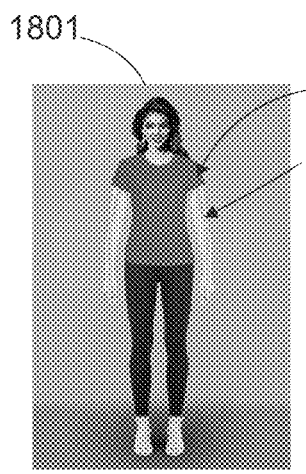
FIG. 18 (a)
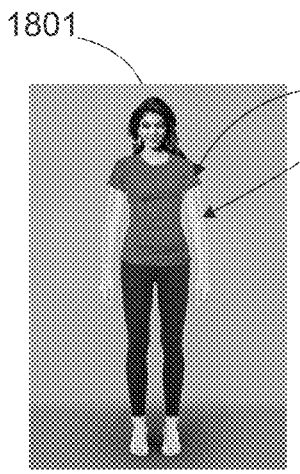
FIG. 18 (b)
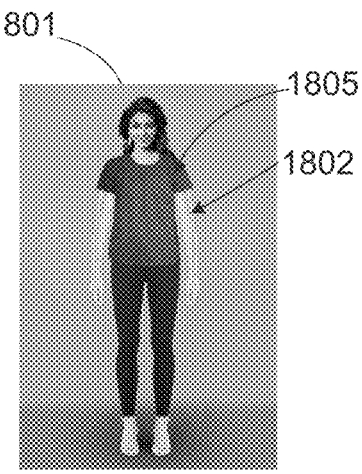
FIG. 18 (c)
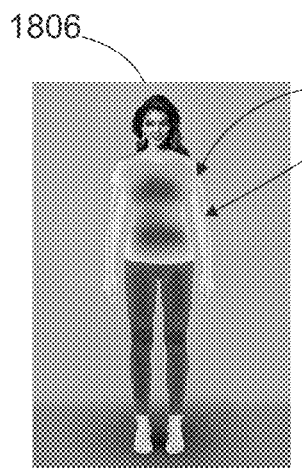
FIG. 18 (a')
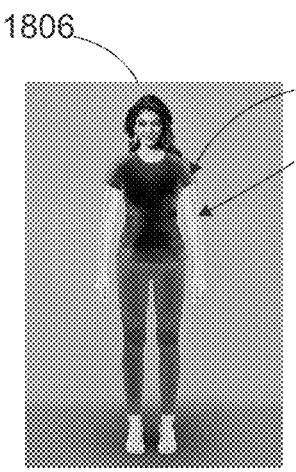
FIG. 18 (b')
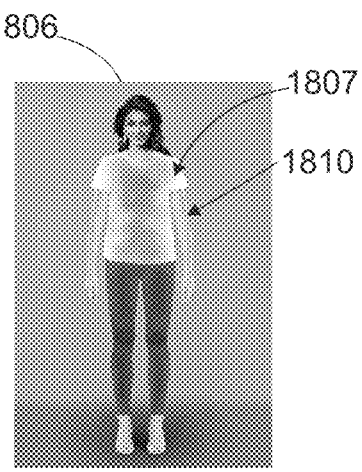
FIG. 18 (c')

VIRTUALLY TRYING CLOTHS ON REALISTIC BODY MODEL OF USER

FIELD OF INVENTION

The present invention relates generally to the field of image processing, particularly to a method and system for generating a realistic body model of user using user image/s and virtually wearing of cloths.

BACKGROUND

Till now, when we do online shopping, the clothes are shown in an un-worn state. A user cannot perceive by just seeing the cloth about how he/she is going to look in that particular cloth.

However, to provide some experience, the online sellers have started showing the cloth being worn by a model. However, the model has particular body measurement and curves, which may be quite different with the user's body measurement and curves. It is generally difficult to perceive for a user to match his/her size for wearing a particular sized clothes, by just seeing the model wearing a predefined size of cloth.

Also, a particular sized cloth looks quite different on each person and it is quite dependent on user's perception whether he likes the cloth after wearing it or not. Many times it happens, a user selects multiple dresses to try them out to identify whether he likes them wearing or not. It generally happens that, even though the size and fittings are good, still user rejects a particular cloth because he does not like it wearing. Such experience cannot be provided by any model wearing the particular sized cloth or any other sized cloth.

One of the reasons for not liking the cloth after wearing it is that each cloth has different contrast or match with a particular skin tone. Even the facial features change the feel of wearing the cloth. Also, each body has different curves and colour pattern differs on a particular cover. This change in colour pattern on different curves on the user body also changes liking and un-liking of the cloth by a user. The best perception by user can be made when the user can have an experience related to seeing the cloth being worn in similar body measurement, body curves, skin tone and facial features.

Further, the user will like to replicate his/her wearing experience on different type of clothes and at different stores.

To give a feel of to a user wearing a clothes, few methods have been known where:

3D models of a person are generated which is a time consuming affair. After generating the 3D model, 3D clothes are put on the 3D model, which gives an unrealistic feel.

User uploads a photo and further image of a cloth is dragged onto the photo. However, it creates problems with respect to, zoom in-zoom out of clothes onto the photo, placing of the cloth is not accurate, multiple layers of cloths onto the photo is generally not possible. Additionally this method is uncomfortable to the user when using a non-touch screen medium.

OBJECT OF THE INVENTION

The object of the invention is to provide realistic and fitting wearing experience to an user virtually.

SUMMARY

The object of the invention is achieved by various claims. According to one embodiment of the method, the method includes following steps receiving an user input related to a person, wherein the user input comprises at least one image or photograph of the person, wherein at least one image of the person has face of the person;

using a human body information to identify requirement of the other body part/s;

receiving at least one image or photograph of other human body part/s based on identified requirement;

processing the image/s of the person with the image/s or photograph/s of other human body part/s using the human body information to generate a body model of the person, wherein the body model represent the person whose image/photograph is received as user input, and the body model comprises face of the person;

receiving an image of a cloth according to shape and size of the body model of the person;

combining the body model of the person and the image of the cloth to show the body model of the human wearing the cloth.

The human body information includes at least one of orientation of face of the person in the image of the person, orientation of body of the person in the image of the person, skin tone of the person, type of body part/s shown in the image of person, location and geometry of one or more body parts in image of the person, body/body parts shape, size of the person, weight of the person, height of the person, facial feature information, or nearby portion of facial features, or combination thereof. The facial feature information includes at least one of shape or location of at least face, eyes, chin, neck, lips, nose, or ear, or combination thereof.

According to another embodiment of the method, wherein combining the body model of the person and the image of the cloth to show the body model of the human wearing the cloth with at least a facial expression or body movement, or combination thereof.

According to yet another embodiment of the method, wherein the human body information is collected by user as user input or determined by analyzing/processing the user input.

According to one embodiment of the method, wherein the human body information is a selection input received from the user by clicking on neck or chin or combination, the method further includes:

processing the selection input to extract face from the image/photograph; and processing the extracted face with the image/s or photographs of other human body part/s to generate the body model of the person.

According to another embodiment of the method, wherein combining the body model of person and the image of the cloth by processing the body model of the human and the image of the cloth to generate a single image showing the body model of the human wearing the cloth.

According to yet another embodiment of the method, wherein the method includes combining the body model of person and the image to generate a scene having the image of the cloth overlaying onto the body model showing the body model of the person wearing the cloth.

According to one embodiment of the method, wherein the image of the cloth is provided from a database based on at least one of the human body information, or a parameter information of body model of the person, or combination thereof, whereas parameter information is related to the shape and size of body model of the person.

According to another embodiment of the method, wherein providing the image of the cloth after processing based on at least one of the human body information and parameter information.

According to yet another embodiment of the method, wherein the user input related to a person further comprising an information related to at least one of the orientation of face of the person in the image of the person, the orientation of body of the person in the image of the person, the skin tone of the person, the type of body part/s shown in the image of person, the location and the geometry of one or more body parts in image of the person, the body or body parts shape & size of the person, the weight of the person, the height of the person, or facial feature information, or nearby portion of facial features, or combination thereof, wherein facial feature information comprises at least one of shape or location of at least face, eyes, chin, neck, lips, nose, or ear, or combination thereof.

According to one embodiment of the method, wherein the method includes processing the image of the human to identify un-exposed body portions in the image of the person, thereafter removing at least one unexposed body portion, and further identifying the required other human part/s suitable to be used for unexposed portion.

According to another embodiment of the method, wherein identifying unexposed body portion by at least:
  detecting skin tone of the person in the image, or
  recognizing the body parts at unexposed body portion, or combination thereof.

According to yet another embodiment of the method, wherein identifying unexposed body portion based on user input related to the person whereas user input comprises marking the unexposed body portions onto the image of the person.

According to one embodiment of the method, the method includes processing image/s of the person using the human body information and thereafter extracting face portion, and providing other human body part/s and processing to merge the face of face portion at neck with other human body part/s to generate the body model of a person. The face portion is part of the image of the person, above the shoulder or neck of the person and encloses face.

According to another embodiment of the method, wherein the face portion comprises some part of the background of the image of the person.

According to yet another embodiment of the method, the method includes generating the face portion with a new background by processing or editing the part of existing background of face portion.

According to one embodiment of the method, the method includes generating the face portion with a new background by processing the part of existing background and other extra image/s.

According to another embodiment of the method, wherein the face portion is further edited to remove background of the image of the person.

According to yet another embodiment of the method, the method includes generating an image of the body model of the person with an additional background by processing the body model of the person and an additional image.

According to one embodiment of the method, wherein identifying facial feature information based on the user input related to the person or the body information related to the person, extracting the face portion based on identified facial feature information, and merging the face of face portion at neck with other human body part/s.

According to another embodiment of the method, wherein the image/s of the person are provided which are in different angles or orientation in 360 degree plane, and generating the body model according to the orientation or captured angles in the images of the person.

According to yet another embodiment of the method, wherein the image of the cloth is provided according to the orientation of the body model of person to provide an optimal fit to the body model.

According to one embodiment of the method, wherein the method includes receiving a cloth input;
  receiving a cloth image based on the cloth input.

According to another embodiment of the method, the method further includes
  receiving images of more than one cloth;
  providing the clothes images in different layers one over another;
  combining the body model of person with the images of the clothes in layers to show the body model of the person wearing the cloths.

According to yet another embodiment of the method, the method includes:
  receiving an add input to add a cloth by choosing a cloth to be added;
  providing changed set of cloth/s by adding the chosen cloth in particular layer based on the add input and placing the chosen cloth in respective layer
  combining the body model of a person with changed set of cloths to show the body model of the person wearing the clothes.

According to one embodiment of the method, the method includes:
  receiving a remove input to remove a cloth by choosing a cloth to be removed;
  providing changed set of cloth/s by removing the chosen cloth from particular layer based on the remove input
  combining the body model of the person with changed set of cloths to show the body model of the person wearing the clothes.

According to another embodiment of the method, the method includes:
  receiving a replace input to replace a cloth by choosing a cloth to be replaced;
  providing a changed set of cloth/s by replacing the chosen cloth from another cloth present at particular layer based on the replace input;
  combining the human body model with changed set of cloths to show the body model of the person wearing the clothes.

According to yet another embodiment of the method, the method includes providing the image of the other human body part/s either from a database based on the human body information about skin tone or the user input of the skin tone of the person, or by processing the other human body part/s based on the human body information about skin tone or the user input of the skin tone of the person.

According to one embodiment of the method, the method includes:
  providing a makeup input related to body part/s of body model of the person on which the makeup is to be applied and information about the make up to be applied on the body part/s;
  detecting the body part/s of the body model of the person based on the makeup input;

applying makeup at least:
by receiving makeup image related to information about the makeup and processing the makeup image/s on the body part/s of body model of a person using the makeup input,
or, by changing color or tone of the body part/s to apply the make-up on the body parts using the makeup input, or combination thereof.

According to another embodiment of the method, the method includes:
providing a face expression input comprising at least one of movement of facial features, lipsing and sound,
processing the body model of the person using the facial expression input to provide the body model with facial expression;
combining the body model with the image of the cloth to show the body model wearing the cloth with the facial expression.

According to yet another embodiment of the method, the method includes:
providing a face expression input at least one of movement of facial features, lipsing and sound,
processing the combined body model with the image cloth using the facial expression input to show of the body model wearing cloth with facial expression.

According to one embodiment of the method, the method includes:
providing an ambient lighting input relating to lighting condition to be provided in the ambience in which the combined body model with the image of cloth is to be shown,
processing the combined body model with the image of cloth using the ambient lighting input by changing at least one of color, contrast, brightness, saturation of the combined body model of the person with the image of the cloth.

According to another embodiment of the method, wherein the user input is related to the image/s or photograph/s of showing face of the person in one or more orientation/s, the method includes:
generate a three dimensional face model of the person by using the images/photographs of person showing face of the person;
rendering the face model in different angle & orientation to generate the image of the person's face in different angle and orientation.
using the images of the person's face in different orientations and the images of other human body part/s in respective orientation to generate the body model of the person.

According to yet another embodiment of the method, the method includes
receiving a wearing input related to a body part onto which the fashion accessory is to be worn and a fashion accessory to be worn onto the part of the body model;
processing the wearing input and at least one of the human body information and the user input related to person and identifying body part/s of body model of the human onto which the fashion accessory is to be worn;
receiving an image/video of the accessory according to the wearing input;
processing the identified body part/s of the body model of the person and the image/video of the accessory to show the combined body model wearing the cloth and the accessory.

According to one embodiment of the method, wherein at least one of the received images or photographs of other human body part/s has at least a portion of body part which is not visible properly or has different level of transparency.

According to another embodiment of the method, wherein the cloth image is transparent or semi-transparent, and showing the body model of the human wearing the transparent or semi-transparent cloth onto the display device.

According to yet another embodiment of the method, wherein the cloth image is merged with the body model of the human at client device at a client-server environment, to show the body model of person wearing cloth onto the display device.

According to one embodiment of the method, wherein the body model of a person is graphic model with rig and produce animation of body model with cloths as output.

BRIEF DESCRIPTION OF THE DRAWINGS

FIG. 18(a)-(c) illustrates the body model of girl wearing right fit, tight fit and loose fit t-shirt and FIG. 18(a')-(c') illustrates the tightness of cloths in different fit by color spectrum for virtually understanding of the tightness of cloth on body.

DETAILED DESCRIPTION

The invention is explained through various illustrations.

Figure 1:
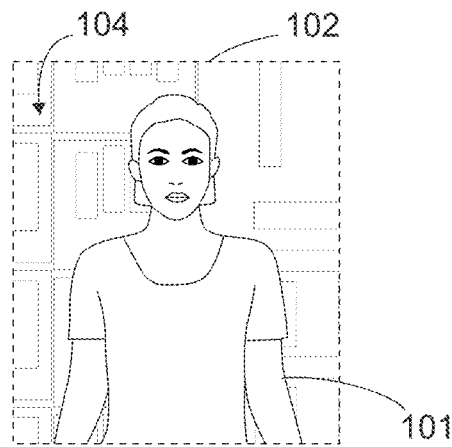
FIGS. 1 (a) and 1(b) illustrates photo/image provided by user, face detection and extraction from the image.
Figure 1:
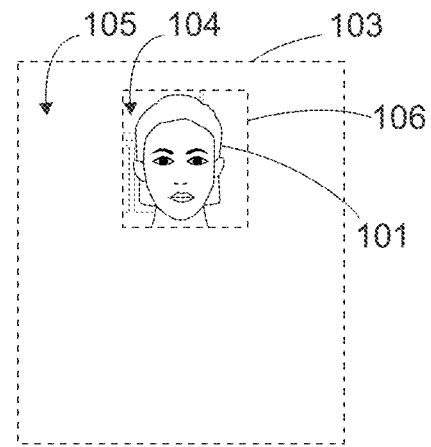

FIG. 1(a) shows an image/photo provided by user. The image 102 shows a user 101 present in a background 104. The image 102 is processed using face detection techniques applied on the image 102 to detect face of the user 101, and further face of the user 101 is extracted and background 104 is either removed or edited to provide a first processed image 103 as shown in FIG. 1 (b). The first processed image 103 is an intermediate output and is provided with a face portion 106 around the face of the user 101, wherein the face portion 106 around the user has the extracted face and some background 104, and remaining part of the image is shown as being empty after processing the image 102 and removing the background and extracting the face.

Figure 2:
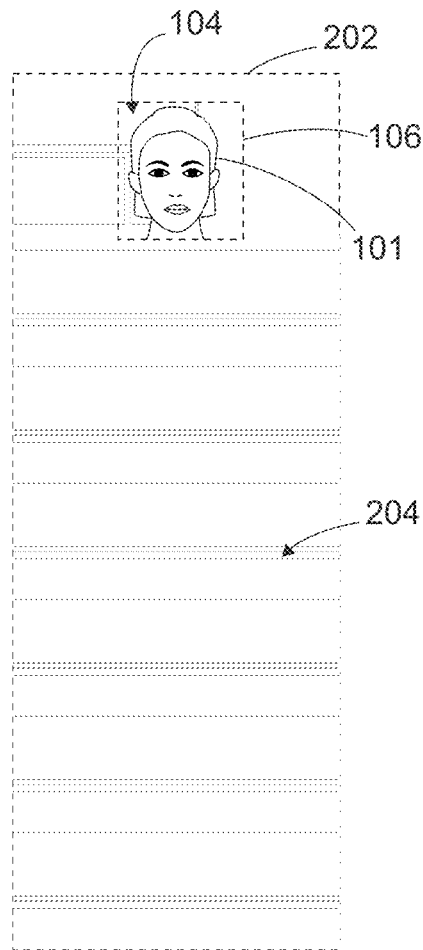
FIGS. 2 (a) and 2(b) illustrates to place extracted face with some background which is generated by editing and processing the previous background of user provided image.
Figure 2:
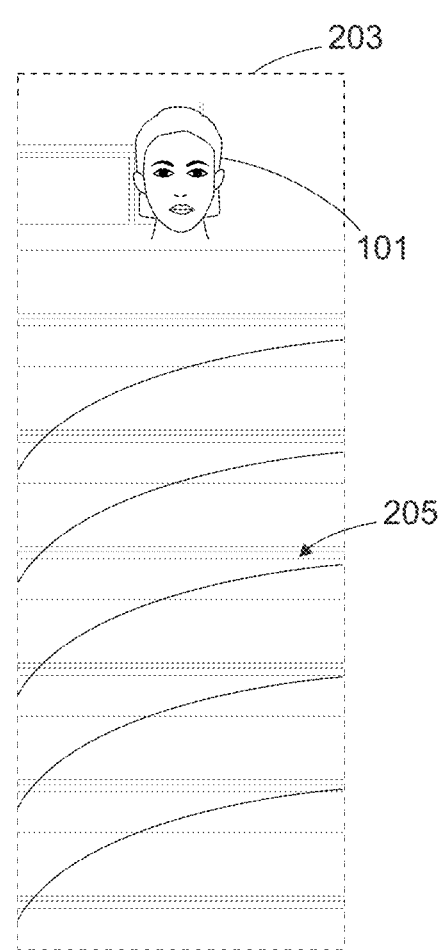

FIG. 2(a) shows an image 202 with extracted face portion 106 with user face 101 and some previous background 104. A new background 204 is generated by optionally using some part of previous background 104 or by image processing. The first processed image 103 is further processed using the background 204 to provide with a second processed image 203 which shows face of the user 101 with edited background 205. An illustration of the second processed image 203 is shown in FIG. 2 (b).

Figure 3:
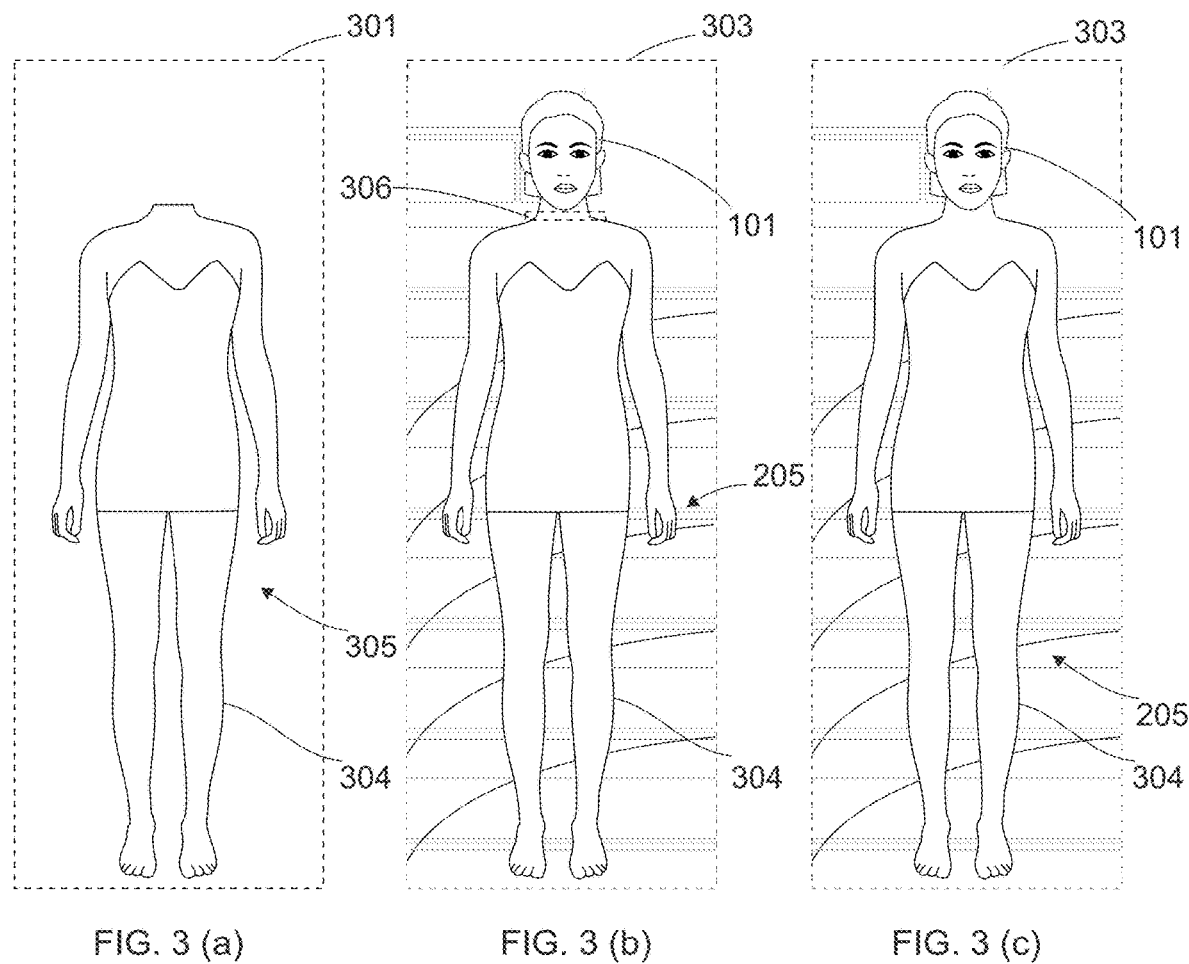
FIG. 3(a)-(c) illustrates generating the user body model with extracted face.

In furtherance, a user is requested to provide input for at least one of the shape or size of his/her body or anyone else's body which he/she shall like to process. Based on the user input an image 301, as shown in FIG. 3(a), of a body model 304 is fetched. The image is having a background 305. Thereafter, the second processed image 203 is further processed using the image 301 of the body model 304 by merging body of the body model 304 with the face of the user 101 to provide a third processed image 302 as shown in FIG. 3 (b). The third processed image 302 is having a portion 306 where body of the body model 304 is merged with face 101. The third processed image 302 is also having the background 205 which was present in the second processed image 203. Thereafter, the third processed image 302 is further processed to process merging of the face of the user 101 with the body model 304 at the neck portion, so as to make the merging of the face and body seamless, and to provide a virtual body model as shown in FIG. 3(c). FIG. 3 (c) shows the final processed image 303 having the virtual body model of the user having face 101, body 304 and the background 205.

Figure 4:
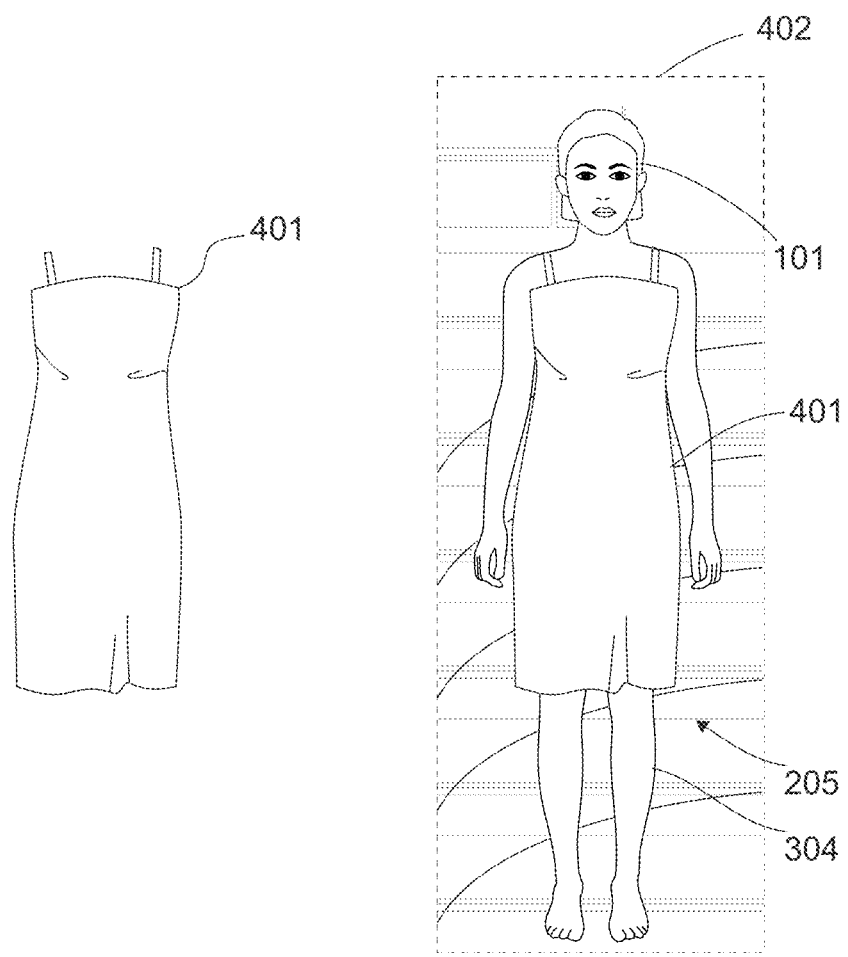
FIGS. 4 (a) and 4(b) illustrates selection of cloth to be worn by user body model and fitting the cloth on user body model.

FIG. 4(a) shows dress 401 which is system generated and which suits fit for body model 304. The dress 401 is processed onto the final processed image 303, so that the dress can be shown fittingly worn by the virtual body model, which is illustrated in FIG. 4(b).

Figure 5:
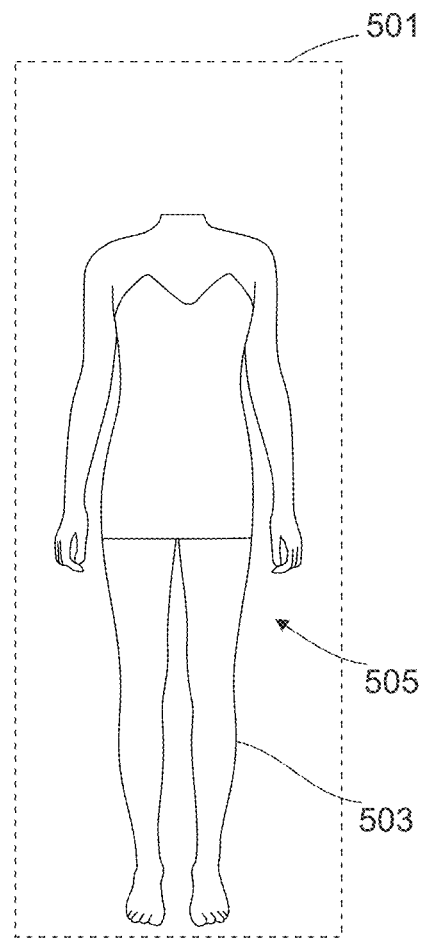
FIGS. 5 (a) and 5(b) illustrates choice of body model for different body shape and size of user.
Figure 5:
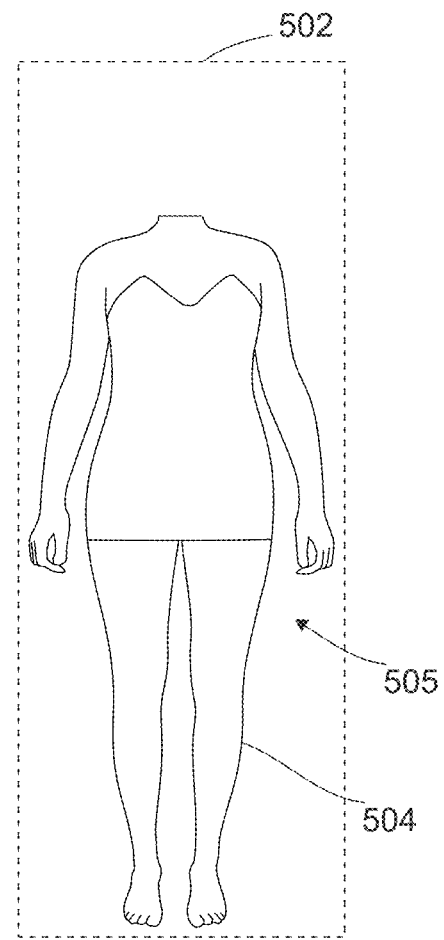

FIG. 5(a) shows an image 501 showing body model 503 in one particular size with background 505. FIG. 5(b) shows another image 502 showing body model 504 which is different in shape and size with respect to the body model 503. Based on user input, the body models are automatically generated, and body models 503, 504 are exemplary body models which are generated based on different user inputs. These body models 503, 504, either shall be generated in real time on receiving the user inputs, or shall be fetched from a database storing body models based on user input. Each of the body models which are stored in the database shall be mapped to different shapes and sizes, where the shapes and sizes in the mapping may be having continuous range for each body model or shall have discreet values. These body models can be used to generate virtual body models with user face in different shapes and/or sizes and thereafter images shall be generated showing the generated virtual models wearing of cloths and accessories.

Figure 6:
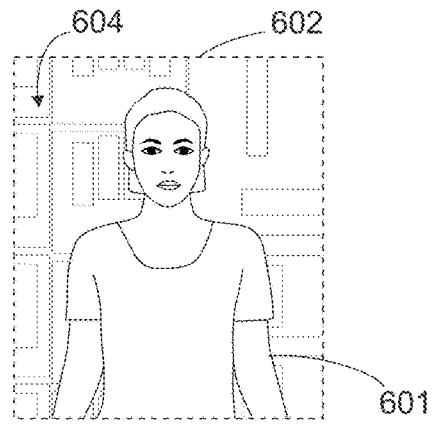
FIGS. 6 (a) and 6(b) illustrates photo/image provided by user, face detection and extraction from the image without background.
Figure 6:
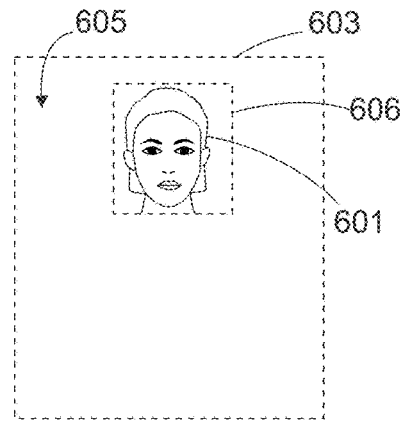

FIG. 6(a) shows an image/photo provided by user. The image 602 shows a user 601 present in a background 604. The image 602 is processed using face detection techniques applied on the image 602 to detect face of the user 601, and further face of the user 601 is extracted and background 604 is removed to provide a first processed image 603 as shown in FIG. 6 (b). The first processed image 603 is an intermediate output and is provided with a face portion 606 having the face of the user 601 and an empty area 605 around the face of the user 601 referring to removed background 604.

Figure 7:
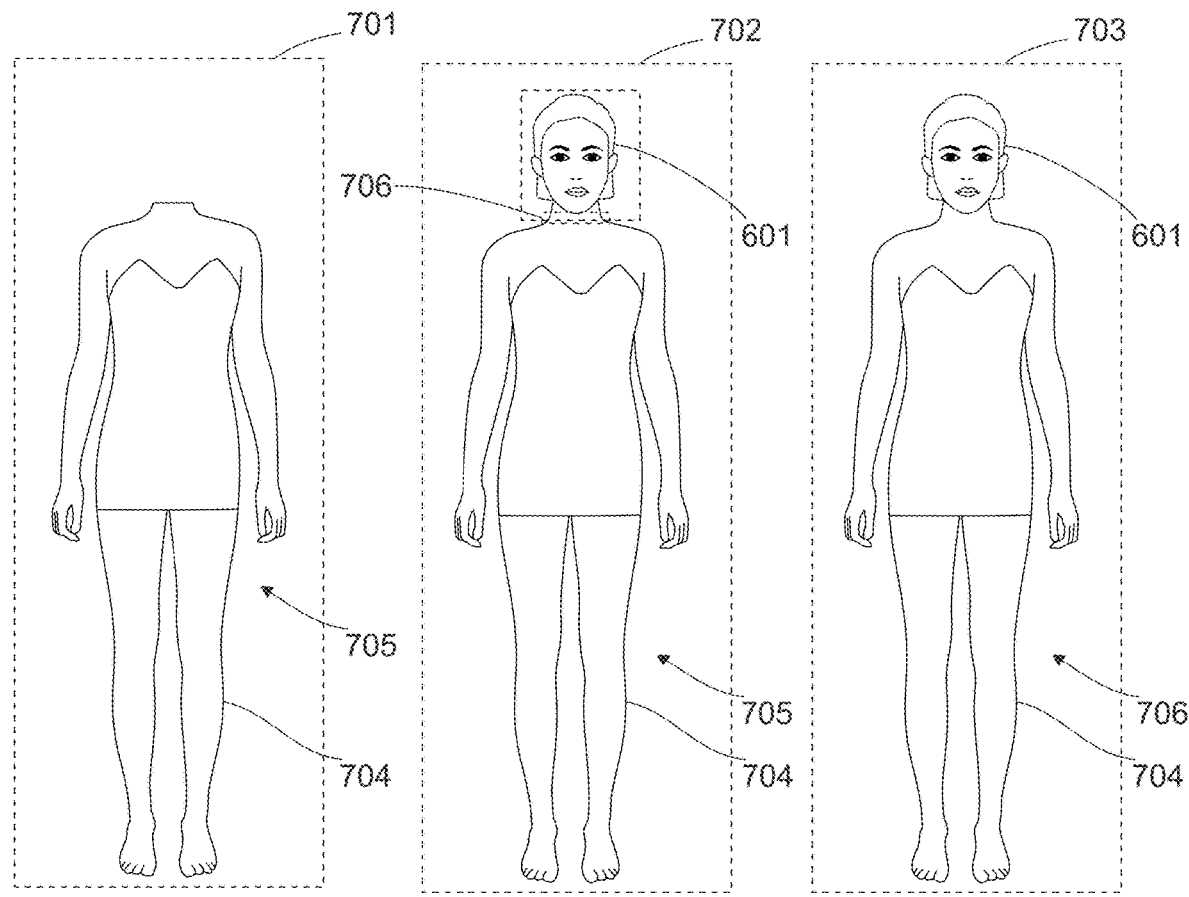
FIG. 7(a)-(c) illustrates generating the user body model with extracted face as defined in FIG. 6(b).

In furtherance, a user is requested to provide input for at least one of the shape or size of his/her body or anyone else's body which he/she shall like to process. Based on the user input an image 701, as shown in FIG. 7(a), of a body model 704 is fetched. The image is having a background 705. Thereafter, the first processed image 603 is further processed using the image 701 of the body model 704 by merging body of the body model 704 with the face of the user 601 to provide a third processed image 702 as shown in FIG. 3 (b). The third processed image 702 is having a portion 706 where body of the body model 304 is merged with face 601. The third processed image 702 is also having the background 705 which was present in the image 701. Thereafter, the third processed image 702 is further processed to process merging of the face of the user 601 with the body model 704 at the neck portion, so as to make the merging of the face and body seamless, and to provide a virtual body model as shown in FIG. 7 (c). FIG. 7 (c) shows the final processed image 703 having the virtual body model of the user having face 601, body 704 and the background 705.

Figure 8:
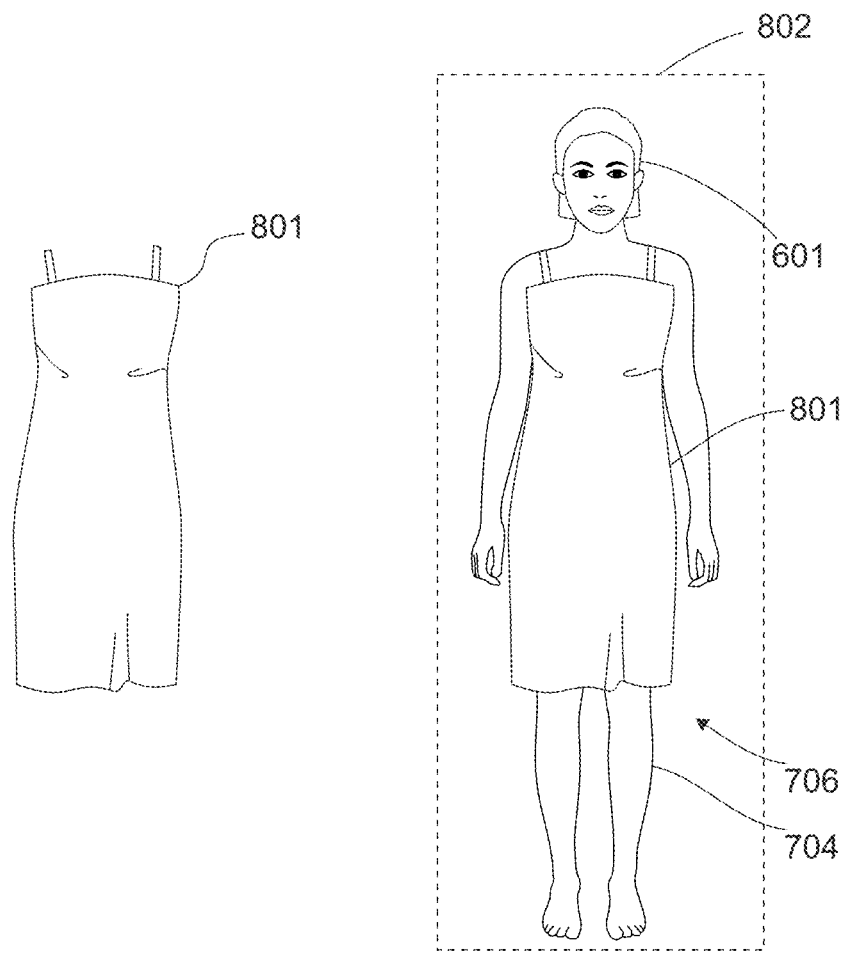
FIGS. 8 (a) and 8(b) illustrates selection of cloth to be worn by user body model generated in FIG. 7 (c) and fitting the cloth on user body model.

FIG. 8(a) shows dress 801 which is system generated and which suits fit for body model 704. The dress 801 is processed onto the final processed image 703, so that the dress can be shown fittingly worn by the virtual body model, which is illustrated in FIG. 4(b).

Figure 9:
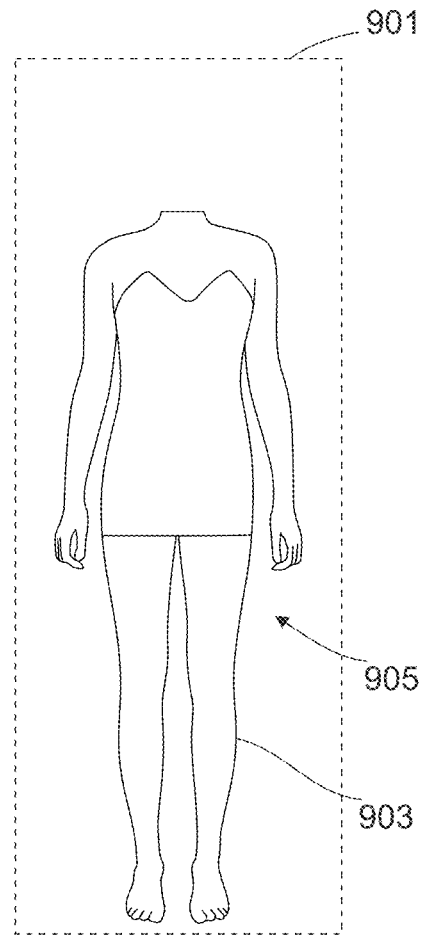
FIGS. 9 (a) and 9(b) illustrates choice of body model for different body shape and size of user.
Figure 9:
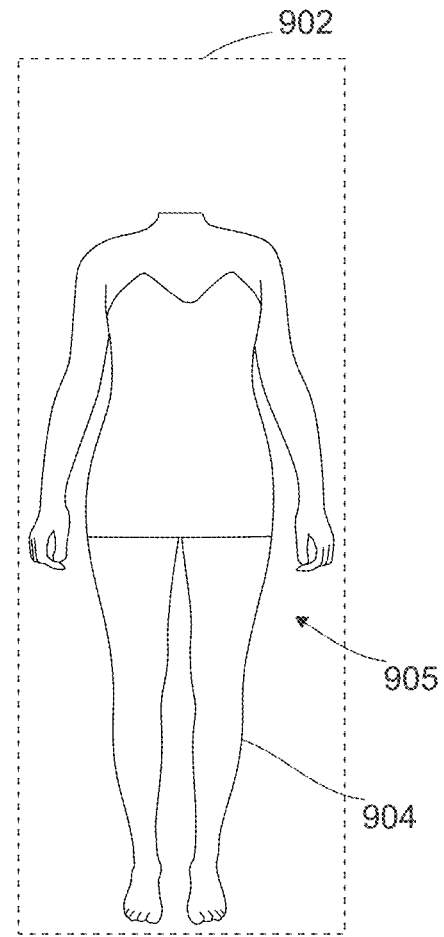

FIG. 9(a) shows an image 901 showing body model 903 in one particular size with background 905. FIG. 9(b) shows another image 902 showing body model 904 which is different in shape and size with respect to the body model 903. Based on user input, the body models are automatically generated, and body models 903, 904 are exemplary body models which are generated based on different user inputs. These body models 903, 904, either shall be generated in real time on receiving the user inputs, or shall be fetched from a database storing body models based on user input. Each of the body models which are stored in the database shall be mapped to different shapes and sizes, where the shapes and sizes in the mapping may be having continuous range for each body model or shall have discreet values. These body models can be used to generate virtual body models with user face in different shapes and/or sizes and thereafter images shall be generated showing the generated virtual models wearing of cloths and accessories.

Figure 10:
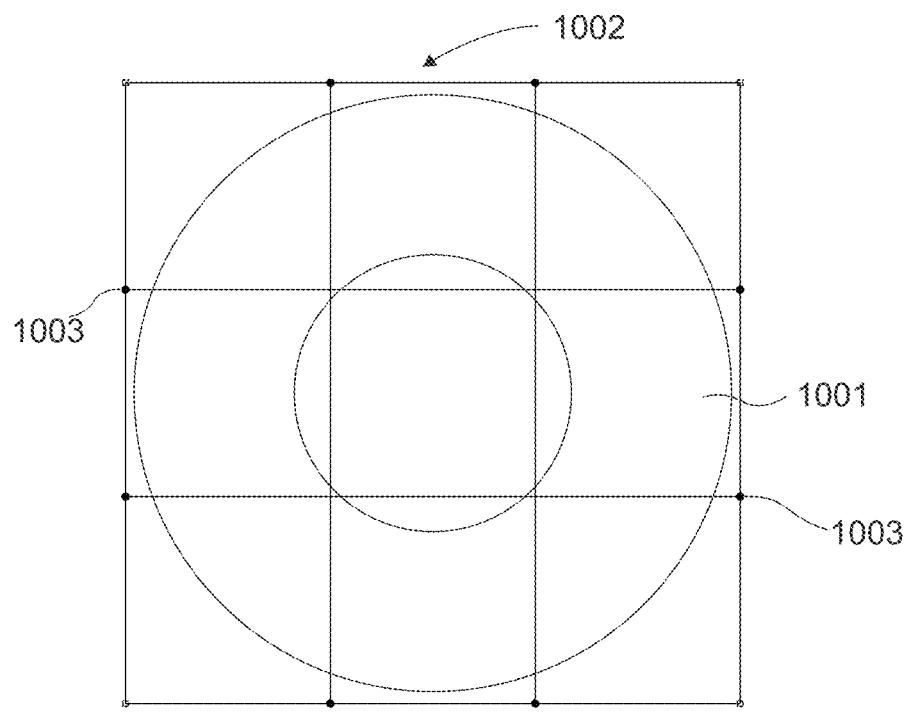
FIGS. 10 (a) and 10(b) illustrates concept for changing shape and size of an image.
Figure 10:
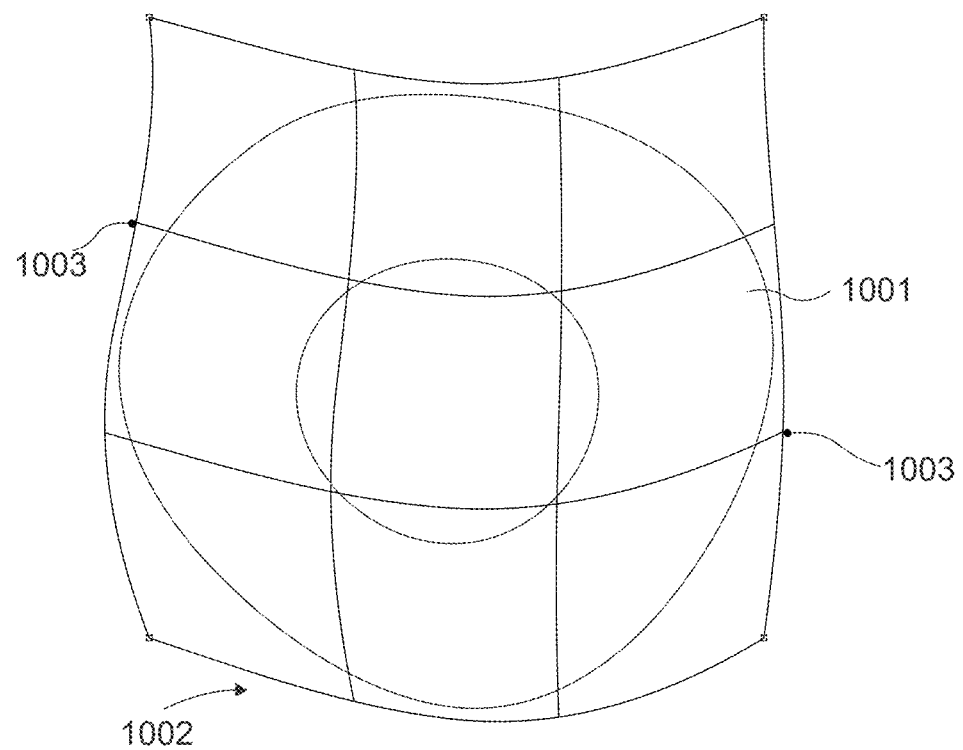

FIG. 10(a) shows an image 1002 having a ring shape 1001. Various nodes 1003 are shown on the image 1002 which after connecting draws an imaginary net on the ring 1001 and shows the complete ring to be divided in different imaginary pieces. FIG. 10(b) shows the warping of ring 1001 whereas warping means that points are mapped to points. This can be based mathematically on any function from (part of) the plane to the plane. If the function is injective the original can be reconstructed. If the function is a bisection any image can be inversely transformed. After warping, the shape of the ring 1001 is changed. It is evident that in the new shape of the ring 1001, position of the nodes 1003 are changed and, so as shape of the lines connecting these nodes 1003. This has led to substantial change in the shape of the ring 1002.

Figure 11:
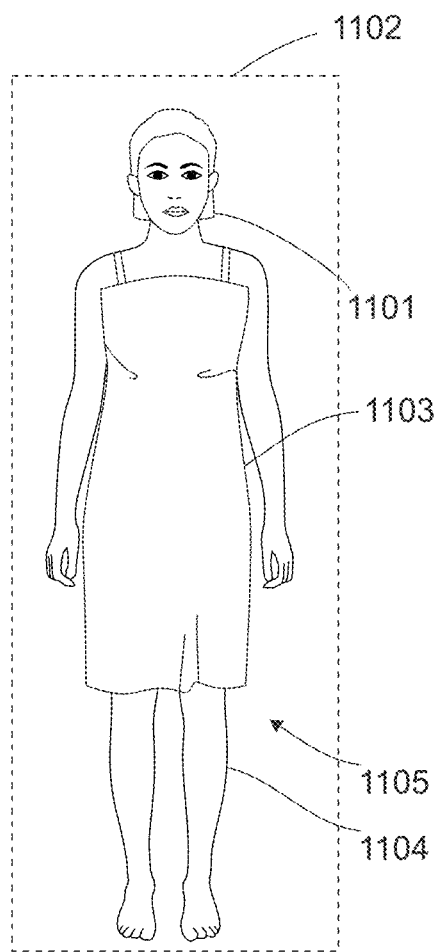
FIG. 11(a)-(e) illustrates wearing of other cloths, accessories and makeup. For an example virtual wearing of spectacles, makeup, more cloths and shoes by user on his/her body model.
Figure 11:
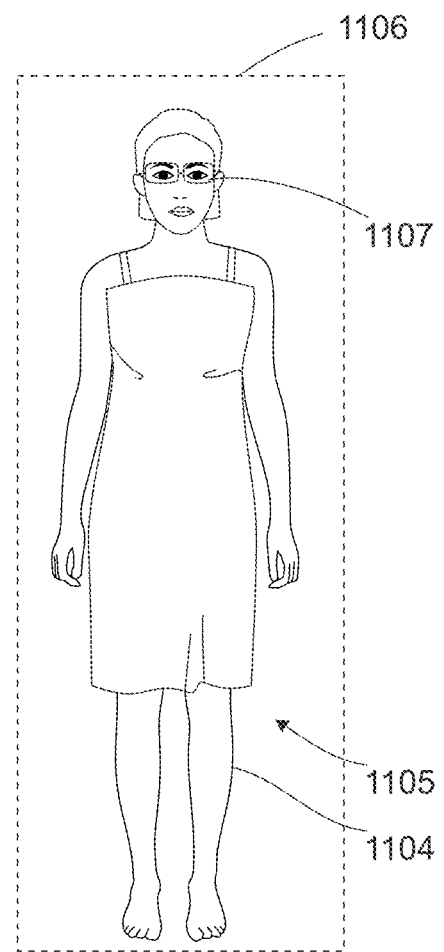
Figure 11:
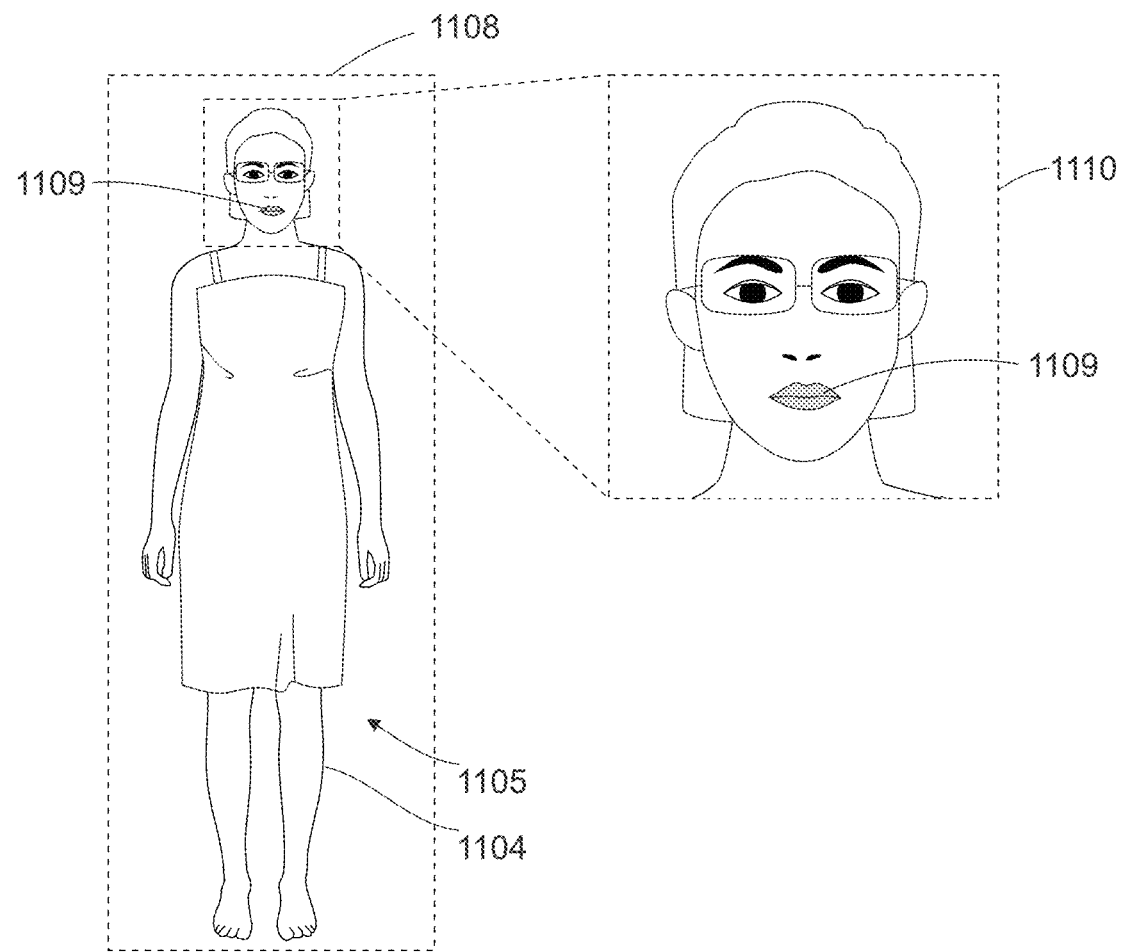
Figure 11:
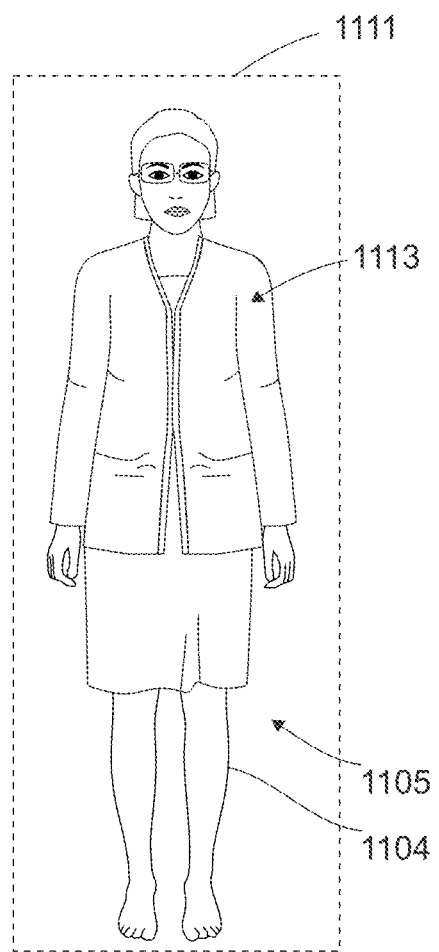
Figure 11:
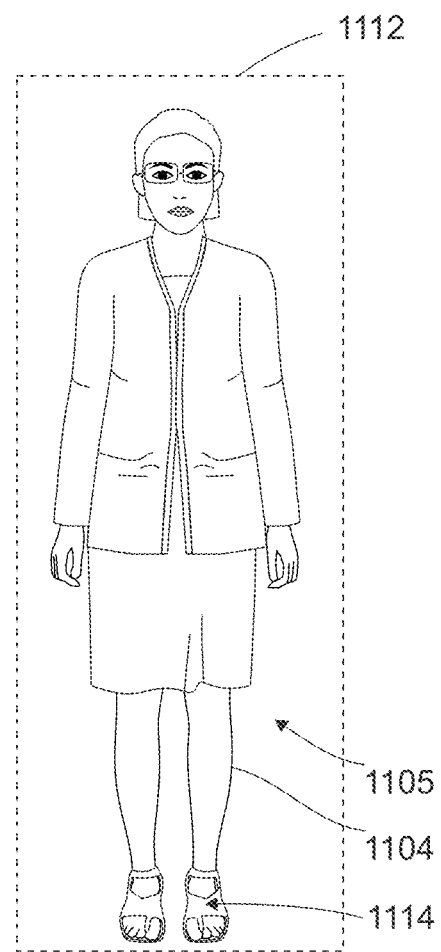

FIG. 11(a)-(e) illustrates virtual model wearing of other cloths, accessories and makeup. These illustrations exemplify, virtual wearing of spectacles, makeup, more cloths and shoes by user on his/her virtual model. FIG. 11(a) shows image 1102 having the virtual model 1104 with dress 1103 and face 1101 and background 1105. For virtual wearing of spectacles, firstly the eyes are detected from the face 1101, and thereafter the image 1102 is processed with an image of spectacles to generate image 1106, as shown in FIG. 11(b), where spectacles 1107 are shown being worn by the virtual model 1104.

To exemplify, wearing of the lipstick on the lips, the image 1106 is processed to identify lips 1109 of the virtual model 1104, and further lipstick is shown being applied onto the virtual model 1104 by changing lips color/contrast/hue/brightness or other property to show makeup at lips 1109, and to accordingly generate image 1108, as shown in FIG. 11(c). Image 1110 shows lips 1109 in zoom.

To exemplify, wearing of clothes in layers, image 1108 is further processed using an image 1113 of another cloth to generate an image 1111 of the virtual model wearing another cloth 1113 in layers onto the cloth 1103 which the virtual model was already wearing.

To further exemplify wearing of shoes by the virtual model, the image 1111 is further processed with an image of shoes 1114, and to generate an image 1112 having the virtual model 1104 wearing the shoes 1114.

Figure 12:
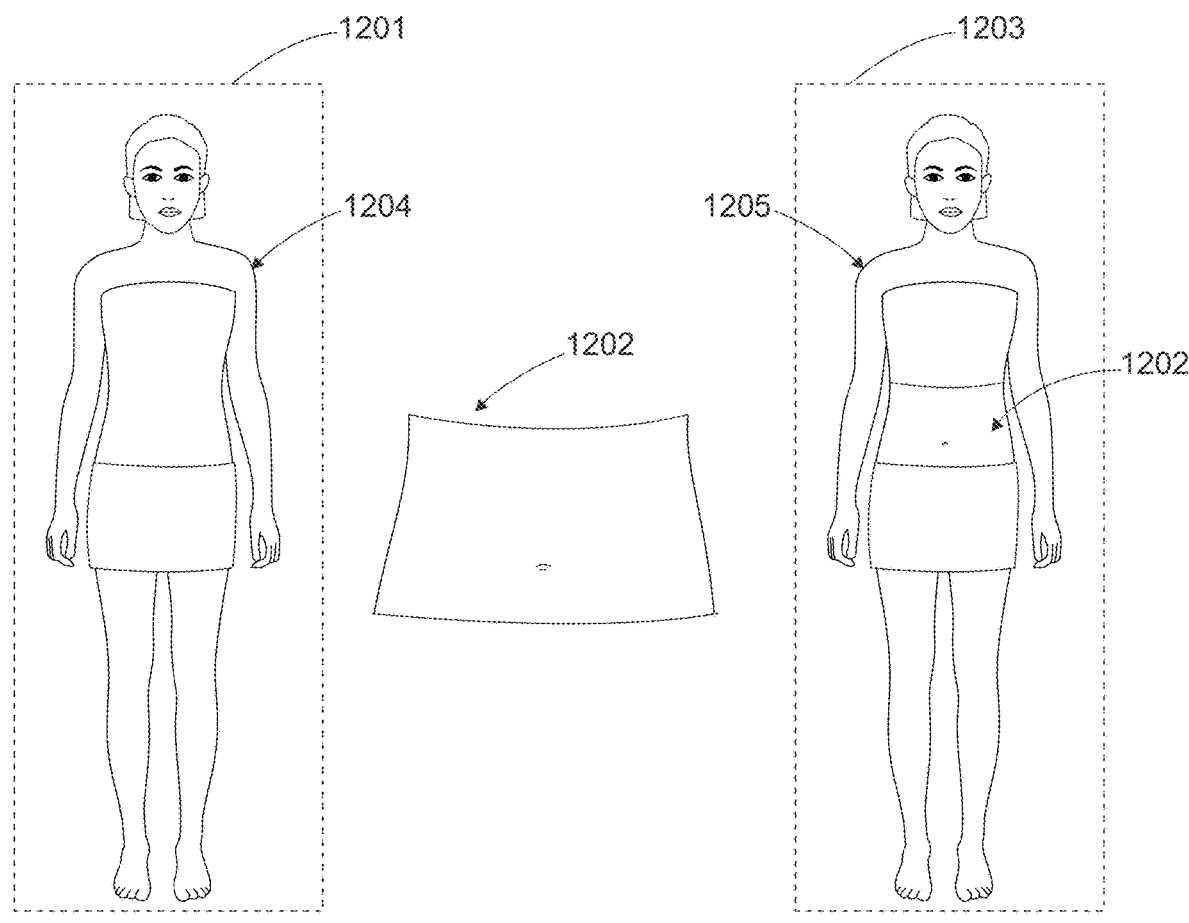
FIG. 12(a)-(c) illustrates generating a body model of user using body part of a third person.

FIG. 12 (a)-(c) shows an alternative way to generate a virtual model. FIG. 12(a) shows a user provided image 1201 which shows a body 1204 of a girl. FIG. 12 (b) shows a body part 1202 of a third person which is fetched from a storage. The image 1201 and the body part 1202 are processed, so that the body part 1202 is placed at an appropriate place onto the body 1204 of the girl, as shown in FIG. 12(c), to generate the virtual model 1205 as shown in the image 1203.

Figure 13:
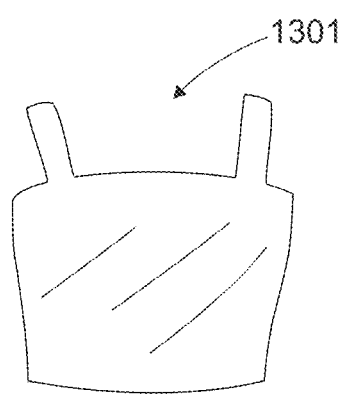
FIGS. 13(a) and 13(b) illustrates wearing of a dress by user body model generated in 12(c).
Figure 13:
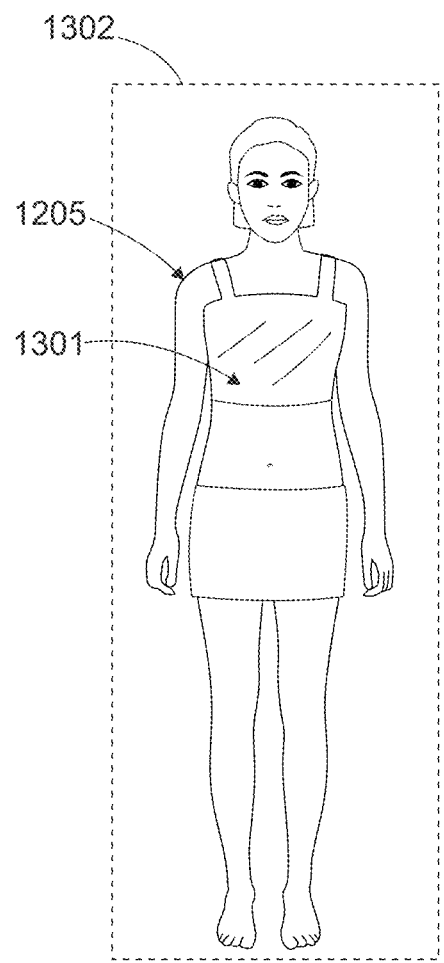

FIG. 13 (a)-(b) illustrates wearing of a dress by virtual model 1205 generated in FIG. 12(c). FIG. 13(a) shows a dress image 1301 which is to be worn by the virtual model 1205. The dress image 1301 is processed along with the image 1203 to generate an image 1302, as shown in FIG. 13(b), which shows the virtual model 1205 wearing the dress 1301 at an appropriate body part.

Figure 14:
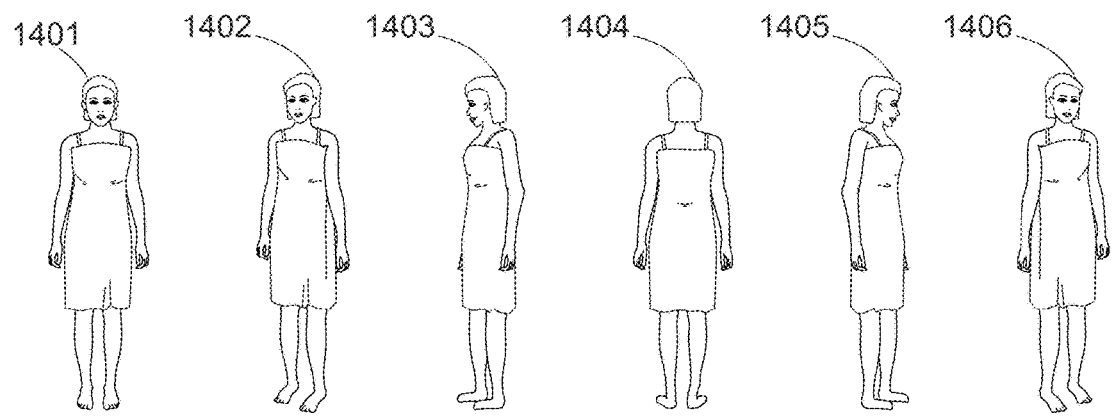
FIG. 14 illustrates wearing of a dress by user body model in different angles and orientation.
Figure 15:
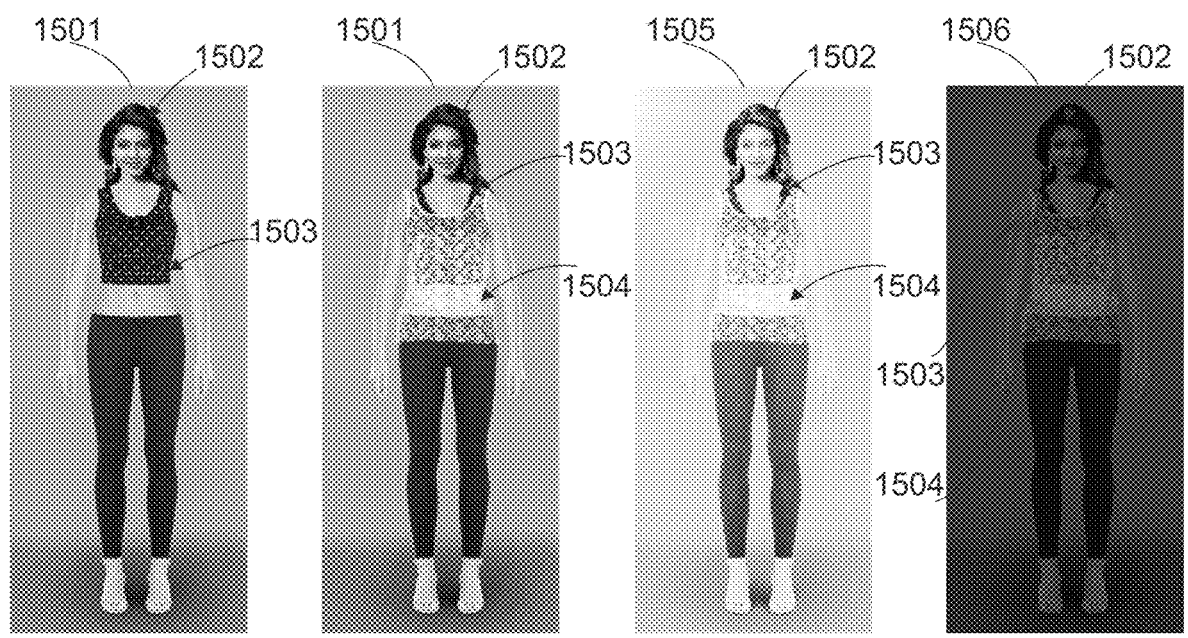
FIG. 15(a)-(d) illustrates the body model of girl wearing non-transparent cloth, semi-transparent cloth and effect of sun & dark on cloth.

FIG. 14 illustrates wearing of a dress by user body model in different angles and orientation. 1401 is produced by processing the user face in front position with other person's body part in front position and processing the cloths in front position. While 1402 is produced by processing the user face in different orientation with other person's body part in same orientation and processing the cloths in same orientation and so on.

FIG. 15(a)-(d) illustrates the body model of girl wearing non-transparent cloth, semi-transparent cloth and effect of sun & dark on cloth by changing an ambient lighting condition in which the combined body model with the image of cloth is shown by processing the combined body model with the image of cloth using the ambient lighting input by changing at least one of color, contrast, brightness, saturation of the combined body model of the person with the image of the cloth.

Figure 16:
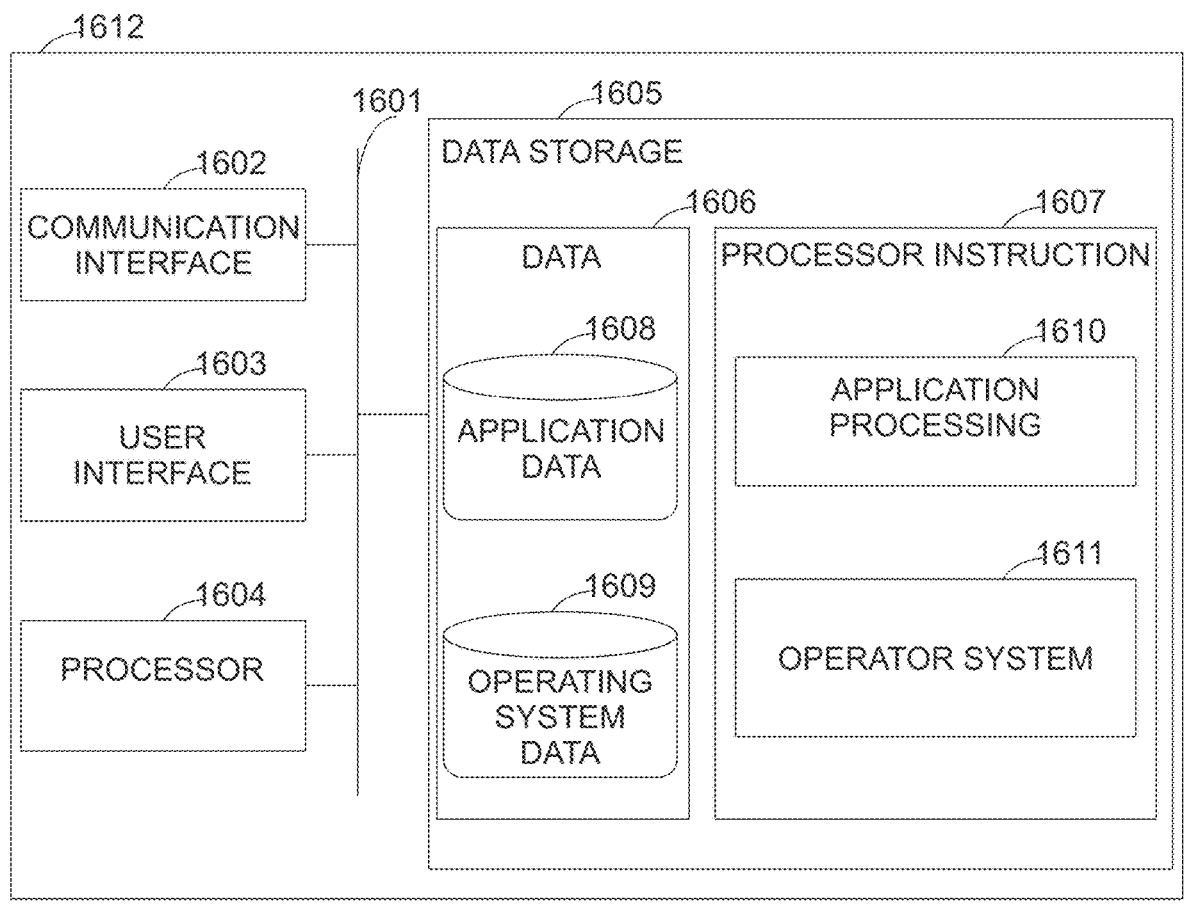
FIG. 16 illustrates a block diagram of the system implementing the invention.

FIG. 16 is a simplified block diagram showing some of the components of an example client device 1612. By way of example and without limitation, client device is a computer equipped with one or more wireless or wired communication interfaces.

As shown in FIG. 16, client device 1612 may include a communication interface 1602, a user interface 1603, a processor 1604, and data storage 1605, all of which may be communicatively linked together by a system bus, network, or other connection mechanism.

Communication interface 1602 functions to allow client device 1612 to communicate with other devices, access networks, and/or transport networks. Thus, communication interface 1602 may facilitate circuit-switched and/or packet-switched communication, such as POTS communication and/or IP or other packetized communication. For instance, communication interface 1602 may include a chipset and antenna arranged for wireless communication with a radio access network or an access point. Also, communication interface 1602 may take the form of a wireline interface, such as an Ethernet, Token Ring, or USB port. Communication interface 1602 may also take the form of a wireless interface, such as a Wifi, BLUETOOTH®, global positioning system (GPS), or wide-area wireless interface (e.g., WiMAX or LTE). However, other forms of physical layer interfaces and other types of standard or proprietary communication protocols may be used over communication interface 102 Furthermore, communication interface 1502 may comprise multiple physical communication interfaces (e.g., a Wifi interface, a BLUETOOTH® interface, and a wide-area wireless interface).

User interface 1603 may function to allow client device 1612 to interact with a human or non-human user, such as to receive input from a user and to provide output to the user. Thus, user interface 1603 may include input components such as a keypad, keyboard, touch-sensitive or presence-sensitive panel, computer mouse, joystick, microphone, still camera and/or video camera, gesture sensor, tactile based input device. The input component also includes a pointing device such as mouse; a gesture guided input or eye movement or voice command captured by a sensor, an infrared-based sensor; a touch input; input received by changing the positioning/orientation of accelerometer and/or gyroscope and/or magnetometer attached with wearable display or with mobile devices or with moving display; or a command to a virtual assistant.

User interface 1603 may also include one or more output components such as a cut to shape display screen illuminating by projector or by itself for displaying objects, cut to shape display screen illuminating by projector or by itself for displaying virtual assistant.

User interface 1603 may also be configured to generate audible output(s), via a speaker, speaker jack, audio output port, audio output device, earphones, and/or other similar devices, now known or later developed. In some embodiments, user interface 1603 may include software, circuitry, or another form of logic that can transmit data to and/or receive data from external user input/output devices. Additionally or alternatively, client device 112 may support remote access from another device, via communication interface 1602 or via another physical interface.

Processor 1604 may comprise one or more general-purpose processors (e.g., microprocessors) and/or one or more special purpose processors (e.g., DSPs, CPUs, FPUs, network processors, or ASICs).

Data storage 1605 may include one or more volatile and/or non-volatile storage components, such as magnetic, optical, flash, or organic storage, and may be integrated in whole or in part with processor 1604. Data storage 1605 may include removable and/or non-removable components.

In general, processor 1604 may be capable of executing program instructions 1607 (e.g., compiled or non-compiled program logic and/or machine code) stored in data storage 1505 to carry out the various functions described herein. Therefore, data storage 1605 may include a non-transitory computer-readable medium, having stored thereon program instructions that, upon execution by client device 1612, cause client device 1612 to carry out any of the methods, processes, or functions disclosed in this specification and/or the accompanying drawings. The execution of program instructions 1607 by processor 1604 may result in processor 1604 using data 1606.

By way of example, program instructions 1607 may include an operating system 1611 (e.g., an operating system kernel, device driver(s), and/or other modules) and one or more application programs 1610 installed on client device 1612 Similarly, data 1606 may include operating system data 1609 and application data 1608. Operating system data 1609 may be accessible primarily to operating system 1611, and application data 1608 may be accessible primarily to one or more of application programs 1610. Application data 1608 may be arranged in a file system that is visible to or hidden from a user of client device 1612.

Application Data 1608 includes Image data that includes image/s or photograph/s of other human body part/s, Image/s or cloths/accessories, Image of background and images to producing shades and/or Trained Model data that includes the trained model to produced facial features/expression/animation and/or user information that includes information about human body information which is either provided by user as user input or generated by processing the user input comprises user image/s it can be used for next time when user is identify by some kind of login identity, then user will not require to generate the user body model again but can retrieve it from user data and try cloths on it and/or user data which includes generated user body after processing the user image that can be used next time and/or graphics data which includes user body part/s in graphics with rig which can be given animation which on processing with user face produces a user body model with cloths and it can show animation or body part movements wherein human body information comprises at least one of orientation of face of the person in the image of the person, orientation of body of the person in the image of the person, skin tone of the person, type of body part/s shown in the image of person, location and geometry of one or more body parts in image of the person, body/body parts shape, size of the person, weight of the person, height of the person, facial feature information, or nearby portion of facial features, or combination thereof, wherein facial feature information comprises at least one of shape or location of at least face, eyes, chin, neck, lips, nose, or ear, or combination thereof.

Figure 17:
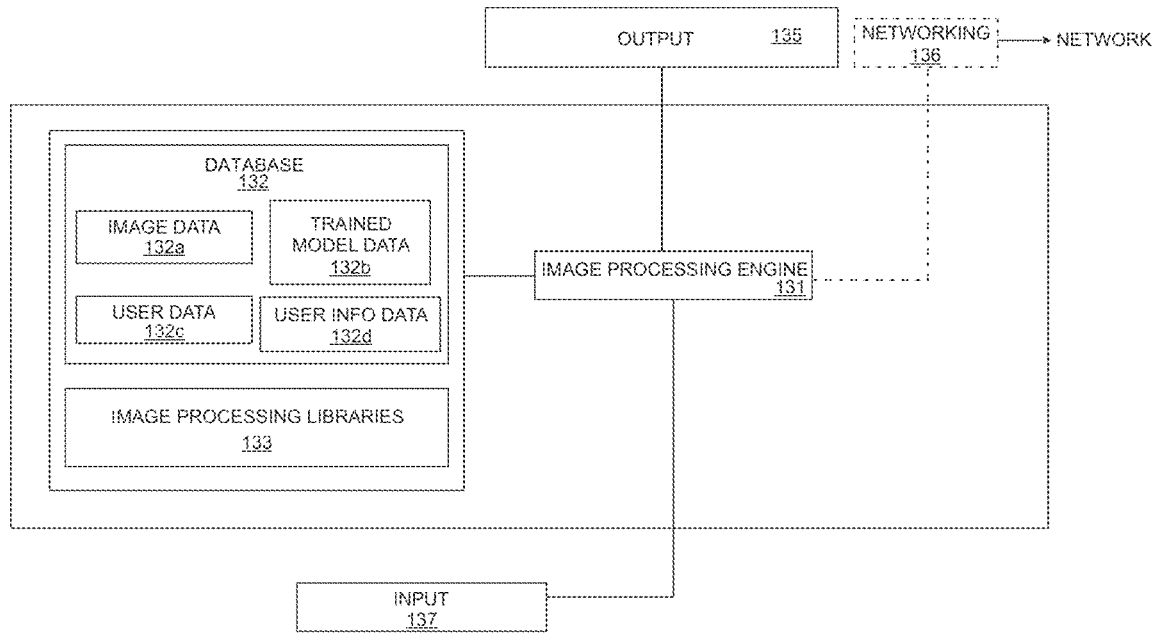
FIG. 17(a)-FIG. 17(b) illustrates a block diagram of another embodiment of the system implementing the invention.
Figure 17:
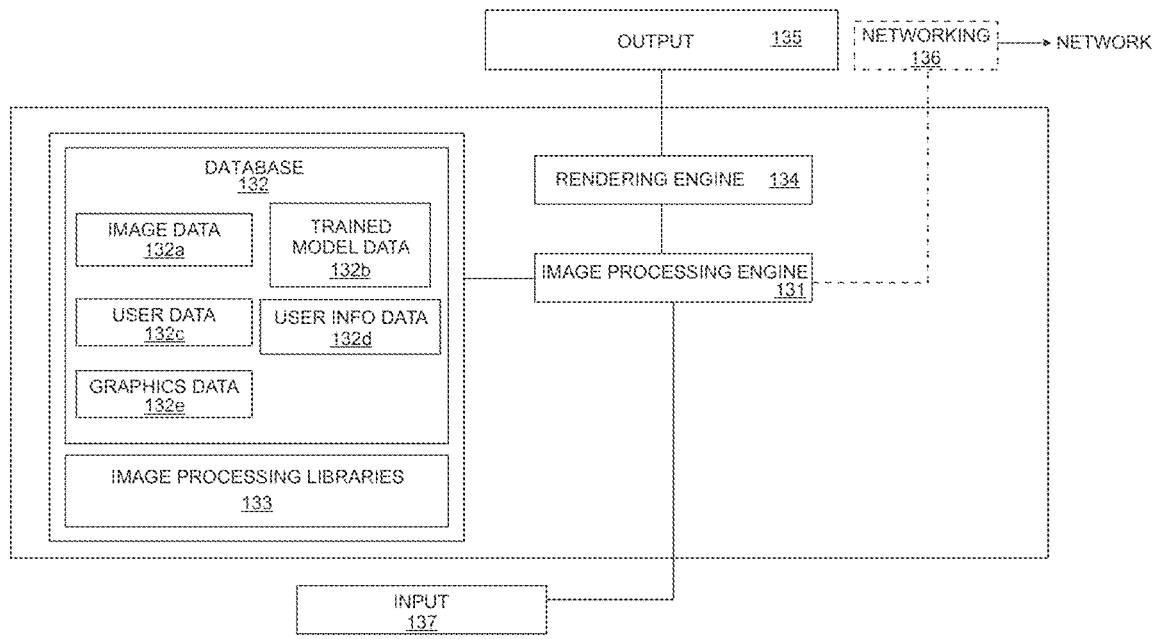

In one embodiment as shown in FIG. 17(*a*), the Image Processing Engine 131 uses Image data 132*a*, trained model data 132*b*, user data 132*c*, user info data 132*d* image processing libraries 133 to generate the output 135, as per user input 137.

In another embodiment as shown in FIG. 17(*b*), sometime when user body with body part movement is required to generate then graphic data 132*e* is also used as its skin with rig can produces animation with the rendering engine 134 to produce output 135.

For generating a body model of a person wearing a cloth, the method includes receiving an user input related to a person, wherein the user input comprises at least one image/photograph of the person, wherein at least one image of the person has face of the person;

using a human body information to identify requirement of the other body part/s;

receiving at least one image or photograph of other human body part/s based on identified requirement;

processing the image/s of the person with the image/s or photograph/s of other human body part/s using the human body information to generate a body model of the person, wherein the body model represent the person whose image/photograph is received as user input, and the body model comprises face of the person;

receiving an image of a cloth according to shape and size of the body model of the person;

combining the body model of the person and the image of the cloth to show the body model of the human wearing the cloth;

wherein human body information comprises at least one of orientation of face of the person in the image of the person, orientation of body of the person in the image of the person, skin tone of the person, type of body part/s shown in the image of person, location and geometry of one or more body parts in image of the person, body/body parts shape, size of the person, weight of the person, height of the person, facial feature information, or nearby portion of facial features, or combination thereof, wherein facial feature information comprises at least one of shape or location of at least face, eyes, chin, neck, lips, nose, or ear, or combination thereof.

The Image Processing Libraries 133 includes library for facial feature extraction, Face detection, body part detection, expression generation/animation, image merging/blending, 3d model generation using front and side image of user face, rigging generation on user body model with or without cloths.

The image processing engine uses database to produce user body model with cloths while in an another embodiment the user body model is produced at 131 and cloth image is merged to make a single image at client device or put in a layer with user body model to looks like user model wearing cloths. While in another embodiment user model with cloths is generated with different facial expression and or with different body movement and or with animation of facial and/or body movement.

The display system can be a wearable display or a non-wearable display or combination thereof.

The non-wearable display includes electronic visual displays such as LCD, LED, Plasma, OLED, video wall, box shaped display or display made of more than one electronic visual display or projector based or combination thereof.

The non-wearable display also includes a pepper's ghost based display with one or more faces made up of transparent inclined foil/screen illuminated by projector/s and/or electronic display/s wherein projector and/or electronic display showing different image of same virtual object rendered with different camera angle at different faces of pepper's ghost based display giving an illusion of a virtual object placed at one places whose different sides are viewable through different face of display based on pepper's ghost technology.

The wearable display includes head mounted display. The head mount display includes either one or two small displays with lenses and semi-transparent mirrors embedded in a helmet, eyeglasses or visor. The display units are miniaturised and may include CRT, LCDs, Liquid crystal on silicon (LCos), or OLED or multiple micro-displays to increase total resolution and field of view.

The head mounted display also includes a see through head mount display or optical head-mounted display with one or two display for one or both eyes which further comprises curved mirror based display or waveguide based display. See through head mount display are transparent or semi transparent display which shows the 3d model in front of users eye/s while user can also see the environment around him as well.

The head mounted display also includes video see through head mount display or immersive head mount display for fully 3D viewing of the user body model with cloths by feeding rendering of same view with two slightly different perspective to make a complete 3D viewing of the user body model with cloths. Immersive head mount display shows user body model with cloths in virtual environment which is immersive.

FIG. 18(a)-(c) illustrates the body model of girl wearing right fit, tight fit and loose fit t-shirt. This is the case when user wants to try different fit on her body model. The cloths of different fit is used to produces such results. In one embodiment cloth of one fit can be processed to produce a cloth of other fit and then shown with the body model of user. FIG. 18(a)-(c) illustrates the tightness of cloths in different fit by color spectrum for virtually understanding of the tightness of cloth on body. The system uses logic based on the information of cloth specification and user body information to estimate the normal, tight or loose fit and shows the stretch of fabric by different colors. Such images of different spectrum may be prepared in real time or may be stored in data base based on different combination of body and cloths.

Figure 19:
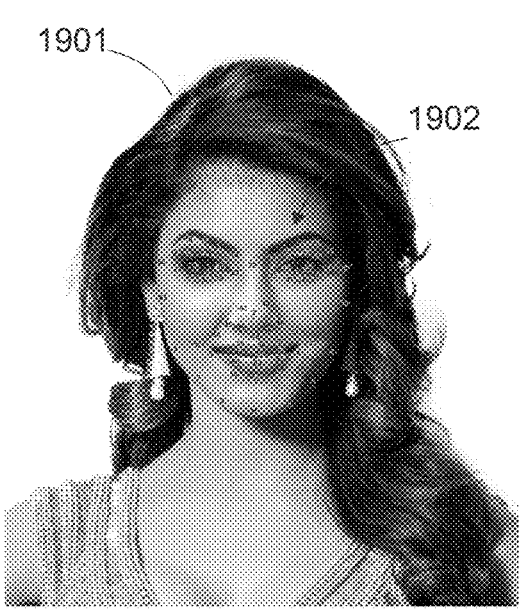
FIG. 19(a)-(b) illustrates the points showing facial feature on user face determined by processing the image using trained model to extract facial feature and segmentation of face parts for producing facial expressions.
FIG. 19(c)-(f) shows different facial expression on user face produced by processing the user face.
Figure 19:
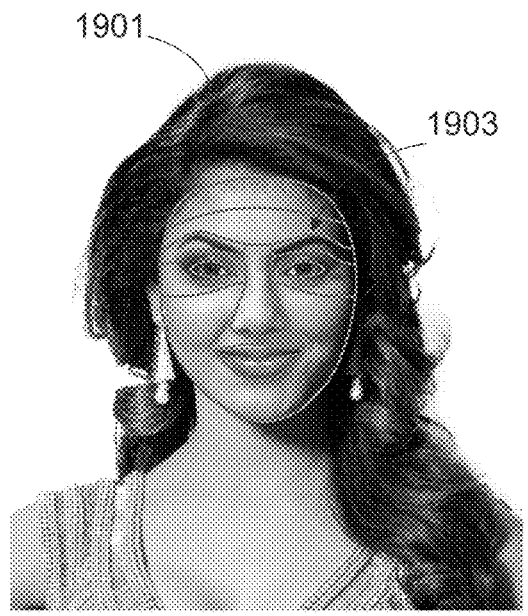
Figure 19:
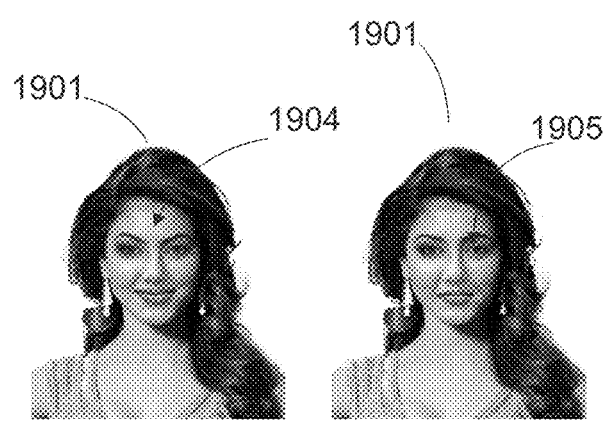

FIG. 19(a)-(b) illustrates the points showing facial feature on user face determined by processing the image using trained model to extract facial feature and segmentation of face parts for producing facial expressions while FIG. 19(c)-(f) shows different facial expression on user face produced by processing the user face.

Figure 20:
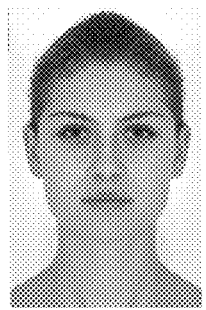
FIG. 20(a)-(c) illustrates the user input of front and side image and face unwrap.
Figure 20:
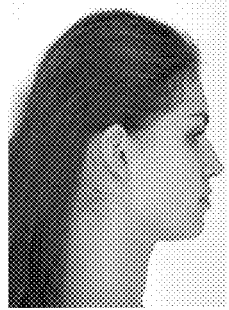
Figure 20:
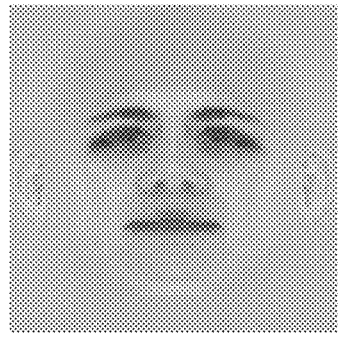

FIG. 20(a)-(b) illustrates the user input of front and side image of face and FIG. 20 (c) show the face unwrap produced by logic of making 3d model of face using front and side image of face.

Figure 21:
FIG. 21(a)-(b) illustrates the face generated in different angle and orientation by generated 3d model of user face.
Figure 21:
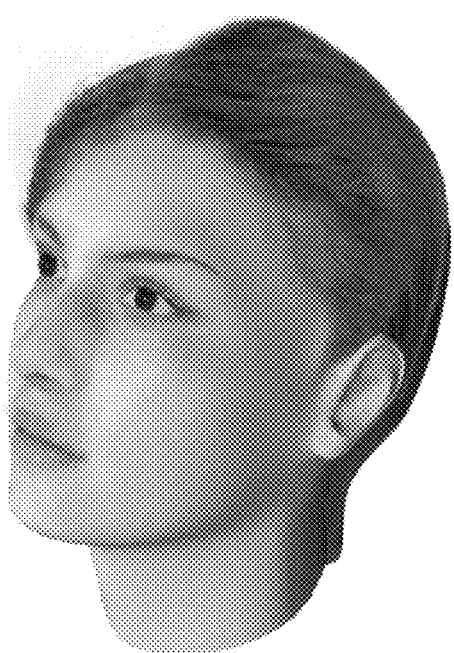

FIG. 21(a)-(b) illustrates the face generated in different angle and orientation by generated 3d model of user face. Once the 3D model of face is generated then it can be rendered to produce face in any angle or orientation to produce user body model in any angle or orientation using other person's body part/s image in same or similar orientation and/or angle.

There Exist Various Methods for Face detection which are based on either of skin tone based segmentation, Feature based detection, template matching or Neural Network based detection.

For example; Seminal work of Viola Jones based on Haar features is generally used in many face detection libraries for quick face detection.

Haar Feature is define as follows:
Lets consider a term "Integral image" which is similar to the summed area table and contains entries for each location such that entry on (x, y) location is the sum of all pixel values above and left to this location.

$$ii(x, y) = \sum_{x' \leq x, y' \leq y} i(x', y')$$

where ii(x, y) is the integral image and i(x, y) is original image.

Integral image allows the features (in this method Haar-like-features are used) used by this detector to be computed very quickly. The sum of the pixels which lie within the white rectangles are subtracted from the sum of pixels in the grey rectangles. Using integral image, only six array reference are needed to compute two rectangle features, eight array references for three rectangle features etc which let features to be computed in constant time O(1).

After extracting Feature, The learning algorithm is used to select a small number of critical visual features from a very large set of potential features Such Methods use only few important features from large set of features after learning result using learning algorithm and cascading of classifiers make this real time face detection system.

In realistic scenario users upload pics which are in different orientation and angels. For such cases, Neural Network based face detection algorithms can be used which leverage the high capacity of convolution networks for classification and feature extraction to learn a single classifier for detecting faces from multiple views and positions. To obtain the final face detector, a Sliding window approach is used because it has less complexity and is independent of extra modules such as selective search. First, the fully connected layers are converted into convolution layers by reshaping layer parameters. This made it possible to efficiently run the Convolution Neural Network on images of any size and obtain a heat-map of the face classifier.

Once we have a detected the face, the next is to find the location of different facial features (e.g. corners of the eyes, eyebrows, and the mouth, the tip of the nose etc) accurately.

For an Example; To precisely estimate the position of facial landmarks in a computationally efficient way, one can use dlib library to extract facial features or landmark points.

Some methods are based on utilizing a cascade of regressors. The cascade of regressors can be defined as follows;

Let $x_i \in R^2$ be the x, y-coordinates of the ith facial landmark in an image I. Then the vector $S=(x_1^T, x_2^T, \ldots, x_p^T)^T \in R^{2p}$ denotes the coordinates of all the p facial landmarks in I. The vector S represent the shape. Each regressor, in the cascade predicts an update vector from the image. On Learning each regressor in the cascade, feature points estimated at different levels of the cascade are initialized with the mean shape which is centered at the output of a basic Viola & Jones face detector.

Thereafter, extracted feature points can be used in expression analysis and generation of geometry-driven photorealistic facial expression synthesis.

For applying makeup on lips, one need to identify lips region in face. For this, after getting facial feature points, a smooth Bezier curve is obtained which captures almost whole lip region in input image. Also, Lip detection can be achieved by color based segmentation methods based on color information. whereas facial feature detection methods give some facial feature points (x,y coordinates) in all cases invariant to different light, illumination, race and face pose. These points cover lip region. However, drawing smart Bezier curves will capture the whole region of lips using facial feature points.

Generally Various Human skin tone lies in a particular range of hue and saturation in HSB color space (Hue, Saturation, Brightness). In most scenario only the brightness part varies for different skin tone in a range of hue and saturation. Under certain lighting conditions, color is orientation invariant. The studies show that in spite of different skin color of the different race, age, sex, this difference is mainly concentrated in brightness and different people's skin color distributions have clustering in the color space removed brightness. In spite of RGB color space, HSV or YCbCr color space is used for skin color based segmentation.

Merging, Blending or Stitching of images are techniques of combining two or more images in such a way that joining area or seam do not appear in the processed image. A very basic technique of image blending is linear blending to combine or merge two images into one image: A parameter X is used in the joining area (or overlapping region) of both images. Output pixel value in the joining region:

$$P_{Joining\_Region}(i,j) = (1-X) * P_{First\_Image}(i,j) + X * P_{Second\_Image}(i,j).$$

Where 0<X<1, remaining region of images are remain unchanged.

Other Techniques such as 'Poisson Image Editing (Perez et al.)', 'Seamless Stitching Of Images Based On A Haar Wavelet 2d Integration Method (Ioana et al.)' or 'Alignment and Mosaicing of Non-Overlapping Images (Yair et al.)' can be used for blending.

For achieving life-like facial animation various techniques are being used now-a day's which includes performance-driven techniques, statistical appearance models or others. To implement performance-driven techniques approach, feature points are located on the face of an uploaded image provided by user and the displacement of these feature points over time is used either to update the vertex locations of a polygonal model, or are mapped to an underlying muscle-based model.

Given the feature point positions of a facial expression, to compute the corresponding expression image, one possibility would be to use some mechanism such as physical simulation to figure out the geometric deformations for each point on the face, and then render the resulting surface. Given a set of example expressions, one can generate photorealistic facial expressions through convex combination. Let $E_i=(G_i, I_i)$, i=0, ..., m, be the example expressions where $G_i$ represents the geometry and Ii is the texture image. We assume that all the texture images $I_i$ are pixel aligned. Let $H(E_0, E_1, ..., E_m)$ be the set of all possible convex combinations of these examples. Then $$H(E_0, E_1, \ldots, E_m) = \left\{ \left( \sum_{i=0}^{m} c_i G_i, \sum_{i=0}^{m} c_i I_i \right) \middle| \sum_{i=0}^{m} c_i = 1, c_i \geq 0, i=0, \ldots, m \right\}$$

While the statistical appearance models are generated by combining a model of shape variation with a model of texture variation. The texture is defined as the pattern of intensities or colors across an image patch. To build a model, it requires a training set of annotated images where corresponding points have been marked on each example. The main techniques used to apply facial animation to a character includes morph targets animation, bone driven animation, texture-based animation (2D or 3D), and physiological models.

I claim:

1. A method for generating a body model of a person wearing a cloth comprising:
   receiving a user input related to a person, wherein the user input comprises at least one image or photograph of the person, wherein the at least one image or photograph of the person has face of the person;
   using human body information to identify requirement of other body part/s;
   receiving at least one image or photograph of the other body part/s based on identified requirement;
   processing the at least one image or photograph of the person with the at least one image or photograph of the other body part/s using the human body information to generate a body model of the person, wherein the body model represent the person whose image/photograph is received as user input, and the body model comprises face of the person, and some body part/s extracted from at least one image or photograph of other body part/s;
   receiving an image of a cloth according to shape and size of the body model of the person;
   Combining the body model of the person and the image of the cloth to show the body model of the human wearing the cloth;
   wherein the human body information comprises at least one of orientation of face of the person in the at least one image or photograph of the person, orientation of body of the person in the at least one image or photograph of the person, skin tone of the person, type of body part/s shown in the at least one image or photograph of person, location and geometry of one or more body parts in image of the person, body/body parts shape, size of the person, weight of the person, height of the person, facial feature information, or nearby portion of facial features, or combination thereof,
   wherein facial feature information comprises at least one of shape or location of at least face, eyes, chin, neck, lips, nose, or ear, or combination thereof.

2. The method according to the claim 1, wherein combining the body model of the person and the image of the cloth to show the body model of the human wearing the cloth with at least a facial expression or body movement, or combination thereof.

3. The method according to the claim 1, wherein the human body information is collected by user as user input or determined by analyzing/processing the user input, optionally:
   wherein the human body information is a selection input received from the user by clicking on neck or chin or combination, the method further comprises:
   processing the selection input to extract face from the image/photograph; and
   processing the extracted face with the image/s or photograph/s of the other body part/s to generate the body model of the person.

4. The method according to the claim 1, wherein combining the body model of person and the image of the cloth by processing the body model of the human and the image of the cloth to generate a single image showing the body model of the human wearing the cloth; and/or
   combining the body model of person and the image to generate a scene having the image of the cloth overlaying onto the body model showing the body model of the person wearing the cloth.

5. The method according to the claim 1, wherein the image of the cloth is provided from a database based on at least one of the human body information, or a parameter information of body model of the person, or combination thereof, whereas parameter information is related to the shape and size of body model of the person.

6. The method according to the claim 1, wherein providing the image of the cloth after processing based on at least one of the human body information and parameter information.

7. The method according to the claim 1, wherein the user input related to a person further comprising an information related to at least one of the orientation of face of the person in the at least one image or photograph of the person, the orientation of body of the person in the at least one image or photograph of the person, the skin tone of the person, the type of body part/s shown in the image of person, the location and the geometry of one or more body parts in image of the person, the body or body parts shape & size of the person, the weight of the person, the height of the person, or facial feature information, or nearby portion of facial features, or combination thereof, wherein facial feature information comprises at least one of shape or location of at least face, eyes, chin, neck, lips, nose, or ear, or combination thereof.

8. The method according to the claim 1 comprising:
processing the at least one image or photograph of the person to identify un-exposed body portions in the at least one image or photograph of the person, thereafter removing at least one unexposed body portion, and further identifying the required the other parts suitable to be used for unexposed portion, optionally:
wherein identifying unexposed body portion by at least:
detecting skin tone of the person in the image, or
recognizing the body parts at unexposed body portion, or combination thereof, or
wherein identifying unexposed body portion based on user input related to the person whereas user input comprises marking the unexposed body portions onto the at least one image or photograph of the person.

9. The method according to the claim 1 comprising:
processing image/s of the person using the human body information and thereafter extracting face portion, and providing the other body part/s and processing to merge the face of face portion at neck with the other body part/s to generate the body model of a person,
Wherein the face portion is part of the at least one image or photograph of the person, above the shoulder or neck of the person and encloses face, optionally:
wherein the face portion comprises some part of the background of the at least one image or photograph of the person, or
wherein the face portion is further edited to remove background of the at least one image or photograph of the person, further optionally:
comprising:
generating the face portion with a new background by processing or editing the part of existing background of face portion, yet further optionally:
comprising:
generating the face portion with a new background by processing the part of existing background and other extra image/s.

10. The method according to claim 9 comprising at least one of:
a. generating an image of the body model of the person with an additional background by processing the body model of the person and an additional image; and/or
b. wherein identifying facial feature information based on the user input related to the person or the body information related to the person, extracting the face portion based on identified facial feature information, and merging the face of face portion at neck with the other body part/s; and/or
c. wherein the image/s of the person are provided which are in different angles or orientation in 360 degree plane, and generating the body model according to the orientation or captured angles in the images of the person; and/or
d. wherein the image of the cloth is provided according to the orientation of the body model of person to provide an optimal fit to the body model; and/or
e. comprising:
receiving a cloth input;
receiving a cloth image based on the cloth input.

11. The method according to the claim 1 comprising:
receiving images of more than one cloth;
providing the clothes images in different layers one over another;
combining the body model of person with the images of the clothes in layers to show the body model of the person wearing the cloths, optionally:
comprising:
receiving an add input to add a cloth by choosing a cloth to be added;
providing changed set of cloth/s by adding the chosen cloth in particular layer based on the add input and placing the chosen cloth in respective layer
combining the body model of a person with changed set of cloths to show the body model of the person wearing the clothes, or:
comprising:
receiving a remove input to remove a cloth by choosing a cloth to be removed;;
providing changed set of cloth/s by removing the chosen cloth from particular layer based on the remove input
combining the body model of the person with changed set of cloths to show the body model of the person wearing the clothes, or:
comprising:
receiving a replace input to replace a cloth by choosing a cloth to be replaced;
providing a changed set of cloth/s by replacing the chosen cloth from another cloth present at particular layer based on the replace input;
combining the human body model with changed set of cloths to show the body model of the person wearing the clothes.

12. The method according to claim 1 comprising at least one of:
a. providing the image of the other body part/s either from a database based on the human body information about skin tone or the user input of the skin tone of the person, or by processing the other body part/s based on the human body information about skin tone or the user input of the skin tone of the person; and/or
b. comprising:
providing a makeup input related to body part/s of body model of the person on which the makeup is to be applied and information about the make up to be applied on the body part's;
detecting the body part/s of the body model of the person based on the makeup input;
applying makeup at least:
by receiving makeup image related to information about the makeup and processing the makeup image/s on the body part/s of body model of a person using the makeup input, or, by changing color or tone of the body part/s to apply the make-up on the body parts using the makeup input, or combination thereof, and/or c. comprising:
providing a face expression input comprising at least one of movement of facial features, lipsing and sound,
processing the body model of the person using the facial expression input to provide the body model with facial expression;
combining the body model with the image of the cloth to show the body model wearing the cloth with the facial expression and/or d. comprising:
providing a face expression input at least one of movement of facial features, lipsing and sound,
processing the combined body model with the image cloth using the facial expression input to show of the body model wearing cloth with facial expression; and/or e. comprising:
providing an ambient lighting input relating to lighting condition to be provided in the ambience in which the combined body model with the image of cloth is to be shown'
processing the combined body model with the image of cloth using the ambient lighting input by changing at least one of color, contrast, brightness, saturation of the combined body model of the person with the image of the cloth; and/or f. wherein the user input is related to the image/s or photograph/s of showing face of the person in one or more orientation/s, the method comprising:
generate a three dimensional face model of the person by using the images/photographs of person showing face of the person;
rendering the face model in different angle & orientation to generate the image of the person's face in different angle and orientation;
using the images of the person's face in different orientations and the images of the other body part/s in respective orientation to generate the body model of the person; and/or g. comprising:
receiving a wearing input related to a body part onto which the fashion accessory is to be worn and a fashion accessory to be worn onto the part of the body model;
processing the wearing input and at least one of the human body information and the user input related to person and identifying body part/s of body model of the human onto which the fashion accessory is to be worn;
receiving an image/video of the accessory according to the wearing input;
processing the identified body part/s of the body model of the person and the image/video of the accessory to show the combined body model wearing the cloth and the accessory; and/or h wherein at least one of the received images or photographs of the other body part/s has at least a portion of body part which is not visible properly or has different level of transparency; and/or i. wherein the cloth image is transparent or semi-transparent, and showing the body model of the human wearing the transparent or semi-transparent cloth onto the display device; and/or j. wherein the cloth image is merged with the body model of the human at client device at a client-server environment, to show the body model of person wearing cloth onto the display device; and/or k. wherein the body model of a person is graphic model with rig and produce animation of body model with cloths as output.

13. A system for showing a body model of a person wearing a cloth comprising:
one or more input devices;
a display device;
a database storing one or more images of the other body part/s, and one or more cloth images; and
machine-readable instructions that upon execution by one or more processors cause the system to carry out operations comprising:
receiving an user input related to a person, wherein the user input comprises at least one image or photograph of the person, wherein at least one image of the person has face of the person;
using human body information to identify requirement of the other body part/s;
receiving at least one image or photograph of the other body part/s based on identified requirement;
processing the at least one image or photograph of the person with the at least one image or photograph of the other body part/s using the human body information to generate a body model of the person, wherein the body model represent the person whose image/photograph is received as user input, and the body model comprises face of the person, and some body part/s extracted from at least one image or photograph of other body part/s;
receiving an image of a cloth according to shape and size of the body model of the person;
Combining the body model of the person and the image of the cloth to show the body model of the human wearing the cloth;
wherein the human body information comprises at least one of orientation of face of the person in the at least one image or photograph of the person, orientation of body of the person in the at least one image or photograph of the person, skin tone of the person, type of body part/s shown in the image of person, location and geometry of one or more body parts in image of the person, body/body parts shape, size of the person, weight of the person, height of the person, facial feature information, or nearby portion of facial features, or combination thereof,
wherein facial feature information comprises at least one of shape or location of at least face, eyes, chin, neck, lips, nose, or ear, or combination thereof.

14. The system according to the claim 13, wherein the display device is a wearable display or a non-wearable display or combination thereof,
wherein the non-wearable display comprises:
electronic visual displays comprising either one of LCD, LED, Plasma, OLED, video wall, box shaped display or display made of more than one electronic visual display or projector based or combination thereof,
a pepper's ghost based display with one or more faces made up of transparent inclined foil/screen illuminated by projector/s and/or electronic display/s wherein projector and/or electronic display showing different images of a body model of the person with cloths in different camera angle at different faces of pepper's ghost based display giving an illusion of body of a person with cloth, placed at one places whose different sides are viewable through different face of display based on pepper's ghost technology, wherein the wearable display comprises:

head mounted display, the head mount display comprises either one or two small displays with lenses and semi-transparent mirrors embedded in a helmet, eyeglasses or visor, wherein the display units are miniaturised and may include CRT, LCDs, Liquid crystal on silicon (LCos), or OLED or multiple micro-displays to increase total resolution and field of view, wherein the head mounted display comprises:

a see through head mount display or optical head-mounted display with one or two display for one or both eyes which further comprises curved mirror based display or waveguide based display, video see through head mount display or immersive head mount display for fully 3D viewing of the body of the person with cloth in two slightly different perspective to make a complete 3D viewing of the body of the person with cloth.

15. A computer program product stored on a non-transitory computer readable medium and adapted to be executed on one or more processors, wherein the computer readable medium and the one or more processors are adapted to be coupled to a communication network interface, the computer program product on execution to enable the one or more processors to perform following steps comprising:

receiving an user input related to a person, wherein the user input comprises at least one image or photograph of the person, wherein at least one image of the person has face of the person;

using human body information to identify requirement of the other body part/s;

receiving at least one image or photograph of the other body part/s based on identified requirement;

processing the at least one image or the photograph of the person with the at least one image or photograph of the other body part/s using the human body information to generate a body model of the person, wherein the body model represent the person whose image/photograph is received as user input, and the body model comprises face of the person, and some body part/s extracted from at least one image or photograph of other body part/s;

receiving an image of a cloth according to shape and size of the body model of the person;

Combining the body model of the person and the image of the cloth to show the body model of the human wearing the cloth;

wherein the human body information comprises at least one of orientation of face of the person in the at least one image or photograph of the person, orientation of body of the person in the at least one image or photograph of the person, skin tone of the person, type of body part/s shown in the image of person, location and geometry of one or more body parts in image of the person, body/body parts shape, size of the person, weight of the person, height of the person, facial feature information, or nearby portion of facial features, or combination thereof, wherein facial feature information comprises at least one of shape or location of at least face, eyes, chin, neck, lips, nose, or ear, or combination thereof.

* * * * *